US010225917B2

(12) United States Patent
Fujimaki et al.

(10) Patent No.: US 10,225,917 B2
(45) Date of Patent: Mar. 5, 2019

(54) TARGET SUPPLY DEVICE AND EXTREME ULTRAVIOLET LIGHT GENERATING DEVICE

(71) Applicant: GIGAPHOTON INC., Tochigi (JP)

(72) Inventors: Takahisa Fujimaki, Oyama (JP); Takayuki Yabu, Oyama (JP); Yuta Takashima, Oyama (JP); Fumio Iwamoto, Oyama (JP); Yutaka Shiraishi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 16/001,441

(22) Filed: Jun. 6, 2018

(65) Prior Publication Data
US 2018/0288863 A1 Oct. 4, 2018

Related U.S. Application Data

(63) Continuation of application No. PCT/JP2016/072974, filed on Aug. 4, 2016.

(30) Foreign Application Priority Data

Jan. 27, 2016 (WO) .................. PCT/JP2016/052318

(51) Int. Cl.
*H05G 2/00* (2006.01)
*G05D 16/20* (2006.01)
*G05D 23/19* (2006.01)

(52) U.S. Cl.
CPC .............. *H05G 2/006* (2013.01); *H05G 2/00* (2013.01); *H05G 2/008* (2013.01); *G05D 16/2006* (2013.01); *G05D 23/19* (2013.01)

(58) Field of Classification Search
USPC ..................................... 250/504 R
See application file for complete search history.

(56) References Cited

U.S. PATENT DOCUMENTS

2007/0291058 A1  12/2007 Fagerquist et al.
2008/0284827 A1  11/2008 Fagerquist et al.
(Continued)

FOREIGN PATENT DOCUMENTS

JP   S62-074659 A   4/1987
JP   2009-541093 A  11/2009
(Continued)

OTHER PUBLICATIONS

International Search Report issued in PCT/JP2016/052318; dated Apr. 19, 2016.
(Continued)

*Primary Examiner* — Kiet T Nguyen
(74) *Attorney, Agent, or Firm* — Studebaker & Brackett PC

(57) ABSTRACT

A target supply device may include a nozzle configured to output a liquid target substance contained in a tank, an excitation element, a droplet detection unit configured to detect a droplet output from the nozzle, a passage time interval measurement unit configured to measure a passage time interval of droplets, and a control unit. The control unit may be configured to set a proper range of the passage time interval, change the duty value of the electric signal to be input to the excitation element, store the passage time interval measurement values of the droplets generated with respect to a plurality of duty values and variation thereof in association with the duty values, and determine an operation duty value based on the variation from among the duty values with which the passage time interval measurement values are within the proper range, among the duty values.

20 Claims, 35 Drawing Sheets

(56) References Cited

U.S. PATENT DOCUMENTS

| | | |
|---|---|---|
| 2012/0175533 A1 | 7/2012 | Moriya et al. |
| 2013/0051412 A1 | 2/2013 | Miyao et al. |
| 2014/0253716 A1* | 9/2014 | Saito ............... H05G 2/006 348/87 |
| 2014/0284502 A1 | 9/2014 | Nakano et al. |
| 2016/0037616 A1 | 2/2016 | Saito et al. |
| 2017/0053780 A1* | 2/2017 | Iwamoto ............... H05G 2/00 |

FOREIGN PATENT DOCUMENTS

| | | |
|---|---|---|
| JP | 2010-527300 A | 8/2010 |
| JP | 2012-191171 A | 10/2012 |
| JP | 2014-186846 A | 10/2014 |
| WO | 2011/013779 A1 | 2/2011 |
| WO | 2014/189055 A1 | 11/2014 |

OTHER PUBLICATIONS

International Preliminary Report on Patentability issued in PCT/JP2016/052318; dated Jul. 31, 2018.
International Search Report issued in PCT/JP2016/072974; dated Oct. 18, 2016.
International Preliminary Report on Patentability issued in PCT/JP2016/072974; dated Jul. 31, 2018.

* cited by examiner

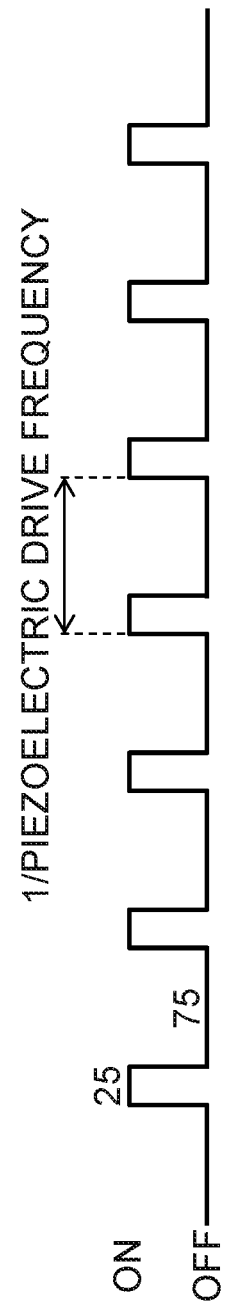

NORMAL DROPLET DISCHARGE STATE

WHEN SATELLITE IS GENERATED

TARGET SUPPLY DEVICE AND EXTREME ULTRAVIOLET LIGHT GENERATING DEVICE

CROSS-REFERENCE TO RELATED APPLICATIONS

The present application is a continuation application of International Application No. PCT/JP2016/072974 filed on Aug. 4, 2016 claiming the priority to International Application No. PCT/JP2016/052318 filed on Jan. 27, 2016. The content of each of the application is incorporated herein by reference in its entirety.

BACKGROUND

1. Technical Field

The present disclosure relates to a target supply device and an extreme ultraviolet light generating device.

2. Related Art

In recent years, along with microfabrication in the semiconductor manufacturing process, miniaturization of a transfer pattern in photolithography of a semiconductor manufacturing process have been developed rapidly. In the next generation, microfabrication of 20 nm or smaller will be required. Accordingly, it is expected to develop an exposure device in which a device for generating extreme ultraviolet (EUV) light having a wavelength of about 13 nm and a reflection reduction projection optical system are combined.

As EUV light generating devices, three types of devices are proposed, namely an LPP (Laser Produced Plasma) type device that uses plasma generated when a target substance is irradiated with laser light, a DPP (Discharge Produced Plasma) type device that uses plasma generated by discharging, and an SR (Synchrotron Radiation) type device that uses orbital radiation light.

CITATION LIST

Patent Literature

Patent Literature 1: Japanese Patent Application Laid-Open No. 2014-186846
Patent Literature 2: International Publication No. WO 2014/189055
Patent Literature 3: National Publication of International Patent Application No. 2010-527300
Patent Literature 4: National Publication of International Patent Application No. 2009-541093
Patent Literature 5: Japanese Patent Application Laid-Open No. 62-074659

SUMMARY

A target supply device according to one aspect of the present disclosure may include a tank, a nozzle, an excitation element, a droplet detection unit, a passage time interval measurement unit, and a control unit. The tank may be configured to contain a liquid target substance. The nozzle may be configured to output the target substance contained in the tank. The excitation element may be driven when an electric signal of a rectangular wave is input. The excitation element may be configured to vibrate the target substance to be output from the nozzle to thereby generate a droplet of the target substance. The droplet detection unit may be configured to detect the droplet output from the nozzle. The passage time interval measurement unit may be configured to measure a passage time interval of the droplets, based on a detection signal obtained from the droplet detection unit. The control unit may be configured to determine an operation duty value that is a duty value of the electric signal suitable for operation of the excitation element, based on a passage time interval measurement value measured by the passage time interval measurement unit. The control unit may be configured to perform a process of setting a proper range of the passage time interval, a process of changing the duty value of the electric signal to be input to the excitation element, and for a plurality of duty values, inputting the electric signal of each of the duty values to the excitation element, and storing the passage time interval measurement values of droplets generated with each of the duty values and variation in the passage time interval measurement values, in association with the duty values, and a process of determining the operation duty value based on the variation from among the duty values with which the passage time interval measurement values are within the proper range, among the duty values.

A target supply device according to another aspect of the present disclosure may include a tank, a nozzle, an excitation element, a droplet detection unit, a passage time interval measurement unit, and a control unit. The tank may be configured to contain a liquid target substance. The nozzle may be configured to output the target substance contained in the tank. The excitation element may be driven when an electric signal of a rectangular wave is input. The excitation element may be configured to vibrate the target substance to be output from the nozzle to thereby generate a droplet of the target substance. The droplet detection unit may be configured to detect the droplet output from the nozzle. The passage time interval measurement unit may be configured to measure a passage time interval of the droplets, based on a detection signal obtained from the droplet detection unit. The control unit may be configured to determine an operation duty value that is a duty value of the electric signal suitable for operation of the excitation element, based on a passage time interval measurement value measured by the passage time interval measurement unit. The control unit may be configured to perform a process of calculating an inter-droplet distance measurement value representing an inter-droplet distance from the passage time interval measurement value, a process of setting a proper range of the inter-droplet distance, a process of changing the duty value of the electric signal to be input to the excitation element, and for a plurality of duty values, inputting the electric signal of each of the duty values to the excitation element, and storing the inter-droplet distance measurement values of droplets generated with each of the duty values and variation in the inter-droplet distance measurement values, in association with the duty values, and a process of determining the operation duty value based on the variation from among the duty values with which the inter-droplet distance measurement values are within the proper range, among the duty values.

BRIEF DESCRIPTION OF THE DRAWINGS

Some embodiments of the present disclosure will be described below as just examples with reference to the accompanying drawings.

FIG. 16A is a waveform chart illustrating an example of a rectangular wave signal of duty 25%;

EMBODIMENTS

Contents

1. Overall description of EUV light generation system
 1.1 Configuration
 1.2 Operation
2. Terms
3. Description of EUV light generating device including target supply device
 3.1 Configuration
 3.2 Operation
4. Description of light emission trigger control system of laser device
 4.1 Configuration
 4.2 Operation
 Problem
6. First embodiment
 6.1 Configuration
 6.2 Operation
 6.3 Effect
7. Second embodiment
 7.1 Configuration
 7.2 Operation
 7.3 Effect
8. Third embodiment
 8.1 Configuration
 8.2 Operation
9. Fourth embodiment
 9.1 Configuration
 9.2 Operation
 9.3 Effect
10. Fifth embodiment
 10.1 Configuration
 10.2 Operation 10.3 Effect
11. Sixth embodiment
11.1 Configuration
11.2 Operation
11.3 Effect
12. Seventh embodiment
12.1 Configuration
12.2 Operation
12.3 Effect
13. Eighth embodiment
13.1 Configuration
13.2 Operation
13.3 Effect
14. Example of combination of embodiments
15. Hardware environment of each control unit Hereinafter, embodiments of the present disclosure will be described in detail with reference to the drawings.

The embodiments described below illustrate some examples of the present disclosure, and do not limit the contents of the present disclosure. All of the configurations and the operations described in the embodiments are not always indispensable as configurations and operations of the present disclosure. It should be noted that the same constituent elements are denoted by the same reference signs, and overlapping description is omitted.

1. Overall Description of EUV Light Generation System

1.1 Configuration

Figure 1:
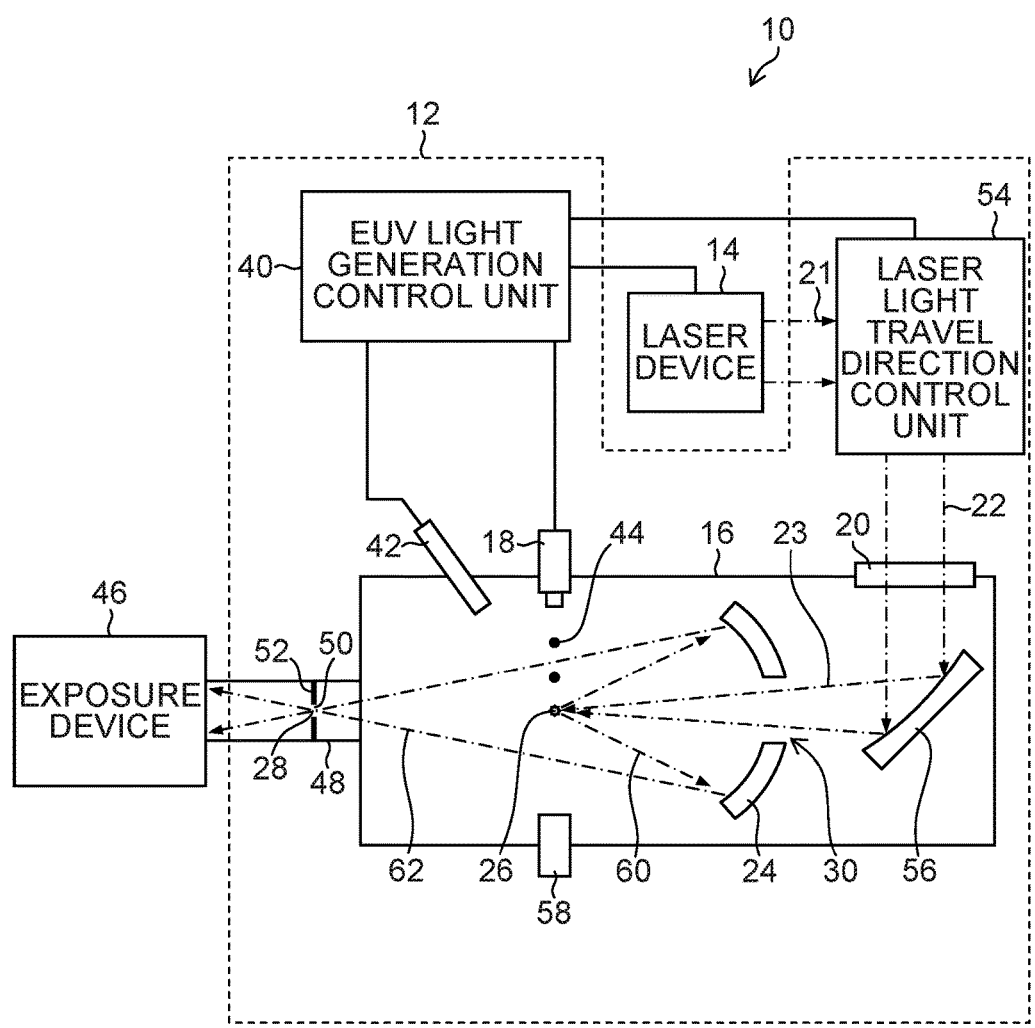
FIG. 1 schematically illustrates a configuration of an exemplary LPP type EUV light generation system.

FIG. 1 schematically illustrates a configuration of an exemplary LPP type EUV light generation system 10. An EUV light generating device 12 may be used together with at least one laser device 14. In the present disclosure, a system including the EUV light generating device 12 and the laser device 14 is called the EUV light generation system 10. As illustrated in FIG. 1 and described below in detail, the EUV light generating device 12 may include a chamber 16 and a target supply unit 18. The chamber 16 may be sealable. The target supply unit 18 may be mounted to penetrate a wall of the chamber 16, for example. The material of a target substance to be supplied from the target supply unit 18 may include, but not limited to, tin, terbium, gadolinium, lithium, xenon, or a combination of any two or more of them.

A wall of the chamber 16 may have at least one through hole. The through hole may be provided with a window 20. Pulse laser light 22 output from the laser device 14 may penetrate the window 20. The inside of the chamber 16 may be provided with an EUV light condensing mirror 24 having a spheroidal reflection surface, for example. The EUV light condensing mirror 24 may have a first focus and a second focus. On the surface of the EUV light condensing mirror 24, a multilayer reflection film in which molybdenum and silicon are alternately layered may be formed. It is preferable that the EUV light condensing mirror 24 is disposed such that the first focus thereof is positioned in a plasma generation region 26 and the second focus thereof is positioned at an intermediate focusing point (IF) 28, for example. A center portion of the EUV light condensing mirror 24 may be provided with a through hole 30 through which pulse laser light 23 may pass.

The EUV light generating device 12 may include an EUV light generation control unit 40, a target sensor 42, and the like. The target sensor 42 may have an image capturing function, and may be configured to detect presence, trajectory, position, velocity, and the like of a target 44.

The EUV light generating device 12 may also include a connecting section 48 that allows the inside of the chamber 16 and the inside of an exposure device 46 to communicate with each other. The inside of the connecting section 48 may be provided with a wall 52 having an aperture 50. The wall 52 may be disposed such that the aperture 50 is positioned at the second focus position of the EUV light condensing mirror 24.

The EUV light generating device 12 may also include a laser light travel direction control unit 54, a laser light condensing mirror 56, a target recovery unit 58 for recovering the target 44, and the like. The laser light travel direction control unit 54 may include an optical element for defining a travel direction of the laser light, and an actuator for regulating the position, posture, and the like of the optical element. The target recovery unit 58 may be disposed on an extended line in a direction that the target 44 output into the chamber 16 travels.

1.2 Operation

Referring to FIG. 1, pulse laser light 21 output from the laser device 14 may pass through the laser light travel direction control unit 54, and then penetrate the window 20 as pulse laser light 22 and enter the chamber 16. The pulse laser light 22 may travel inside the chamber 16 along at least one optical pass of the laser light, may be reflected by the laser light condensing mirror 56, and may be radiated as the pulse laser light 23 to at least one target 44.

The target supply unit 18 may be configured to output the target 44 toward a plasma generation region 26 in the chamber 16. The target 44 may be irradiated with at least one pulse included in the pulse laser light 23. The target 44 irradiated with the pulse laser light is made into plasma, and from the plasma, radiated light 60 may be radiated. EUV light 62 included in the radiated light 60 may be selectively reflected by the EUV light condensing mirror 24. The EUV light 62 reflected by the EUV light condensing mirror 24 may be condensed at the intermediate focusing point 28 and output to the exposure device 46. It should be noted that one target 44 may be irradiated with a plurality of pulses included in the pulse laser light 23.

The EUV light generation control unit 40 may be configured to preside over the control of the entire EUV light generation system 10. The EUV light generation control unit 40 may be configured to process image data or the like of the target 44 captured by the target sensor 42. Further, the EUV light generation control unit 40 may be configured to control the output timing of the target 44, the output direction of the target 44, and the like, for example. Furthermore, the EUV light generation control unit 40 may be configured to control the oscillation timing of the laser device 14, the travel direction of the pulse laser light 22, the condensing position of the pulse laser light 23, and the like, for example. The aforementioned various types of control are mere examples. Other types of control may be added as required.

2. Terms

"Target" is an object to be irradiated with laser light introduced to the chamber. The target irradiated with laser light is made into plasma and emits EUV light.

"Droplet" is a form of a target supplied into the chamber.

"Plasma light" is radiated light radiated from a droplet made into plasma. The radiated light includes EUV light.

The expression "EUV light" is an abbreviation of "extreme ultraviolet light".

The meaning of "interval" in the term "droplet interval" may include both the case where it means a time interval and the case where it means a distance that is a spatial interval.

"Passage timing interval" indicates a time interval of droplet passage timing. The passage timing interval corresponds to a passage time interval of droplets.

"Inter-droplet distance" means a spatial interval between two droplets, that is, a droplet space. The inter-droplet distance in the present disclosure indicates a droplet space in the droplet discharge direction.

"Piezoelectric element" has the same meaning as a "piezoelectric device". A piezoelectric element is a form of an "excitation element".

Figure 2:
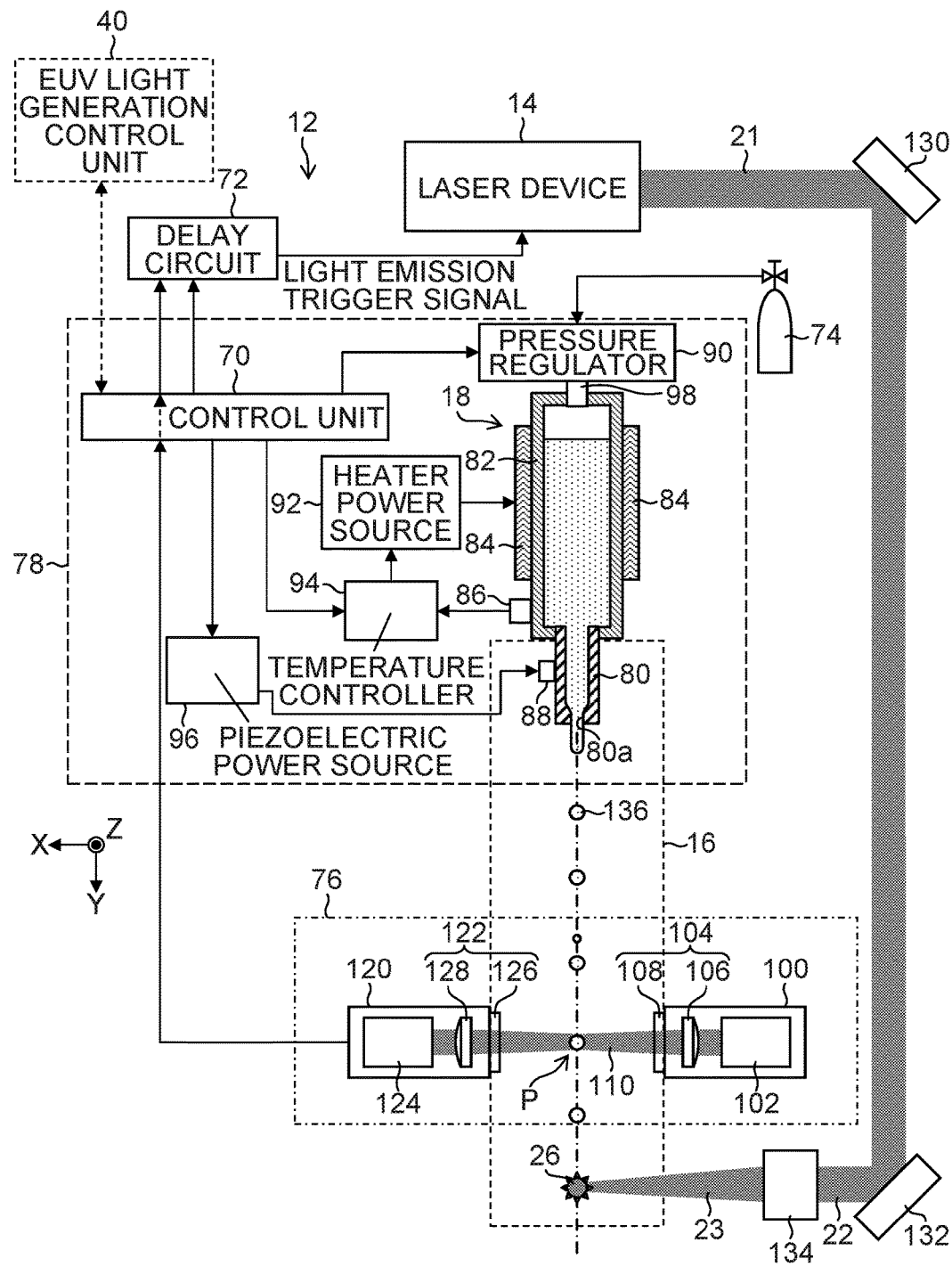
FIG. 2 schematically illustrates a configuration of an EUV light generating device including a target supply device.

3. Description of EUV Light Generating Device Including Target Supply Device 3.1 Configuration FIG. 2 schematically illustrates a configuration of an EUV light generating device including a target supply device. The EUV light generating device 12 may include a control unit 70, a delay circuit 72, the target supply unit 18, an inert gas supply unit 74, and a droplet detection device 76.

The target supply unit 18 may include a nozzle 80 for outputting a target substance, a tank 82 that stores a target substance, a heater 84, a temperature sensor 86, a piezoelectric element 88, and a pressure regulator 90.

The target supply device 78 may include the control unit 70, the target supply unit 18, a heater power source 92, a temperature controller 94, and a piezoelectric power source 96. The target supply device 78 may also include the droplet detection device 76.

The tank 82 may be formed in a hollow cylindrical shape. The hollow tank 82 may contain a target substance. At least the internal part of the tank 82 may be configured of a material that resists chemical reaction with the target substance. A material that resists chemical reaction with tin that is an example of the target substance may be any of SiC, $SiO_2$, $Al_2O_3$, molybdenum, tungsten, and tantalum.

The heater 84 and the temperature sensor 86 may be fixed to the tank 82. The heater 84 may be fixed to the outer side surface of the cylindrical tank 82. The heater 84 fixed to the tank 82 may heat the tank 82. The heater 84 may be connected with the heater power source 92.

The heater power source 92 may supply electric power to the heater 84. The heater power source 92 may be connected with the temperature controller 94. The temperature controller 94 may be connected with the control unit 70 or may be included in the control unit 70. The heater power source 92 may be configured such that power supply to the heater 84 may be controlled by the temperature controller 94.

The temperature sensor 86 may be fixed to the outer side surface of the tank 82. The temperature sensor 86 may be connected with the temperature controller 94. The temperature sensor 86 may detect the temperature of the tank 82, and output a detection signal to the temperature controller 94. The temperature controller 94 may regulate the electric power supplied to the heater 84 based on the detection signal output from the temperature sensor.

The temperature regulating mechanism including the heater 84 and the heater power source 92 may regulate the temperature of the tank 82 based on a control signal of the temperature controller 94.

The pressure regulator 90 may be provided to a pipe 98 placed between the inert gas supply unit 74 and the tank 82. The pipe 98 may allow the pressure regulator 90 and the target supply unit 18 including the tank 82 to communicate with each other. The pipe 98 may be covered with a heat insulating material or the like not illustrated. The pipe 98 may be provided with a heater not illustrated. The temperature inside the pipe 98 may be kept at the same temperature as that inside the tank 82 of the target supply unit 18.

The inert gas supply unit 74 may include a gas cylinder filled with inert gas such as helium, argon, or the like. The inert gas supply unit 74 may feed inert gas into the tank 82 via the pressure regulator 90.

The pressure regulator 90 may include therein a solenoid valve, a pressure sensor, and the like, not illustrated, for air supply and discharge. The pressure regulator 90 may detect the pressure inside the tank 82 with use of a pressure sensor not illustrated. The pressure regulator 90 may be linked to a discharge pump not illustrated. The pressure regulator 90 may operate the discharge pump, not illustrated, to discharge the gas inside the tank 82.

The pressure regulator 90 may increase or decrease the pressure inside the tank 82 by supplying gas into the tank 82 or discharge the gas in the tank 82. The pressure regulator 90 may be connected with the control unit 70. The pressure regulator 90 may output a detection signal of the detected pressure to the control unit 70. A control signal output from the control unit 70 may be input to the pressure regulator 90.

The control unit 70 may supply, to the pressure regulator 90, a control signal for controlling operation of the pressure regulator 90 such that the pressure inside the tank 82 becomes target pressure, based on the detection signal output from the pressure regulator 90. The pressure regulator 90 may supply gas into the tank 82 or discharge gas in the tank 82 based on the control signal from the control unit 70. When the pressure regulator 90 supplies or discharges gas, the pressure inside the tank 82 can be regulated to be target pressure.

The nozzle 80 may include a nozzle hole 80a for outputting a target substance. As an example of a target substance to be output from the nozzle hole 80a, liquid tin may be adopted. The piezoelectric element 88 may be fixed to the nozzle 80. The piezoelectric element 88 may be connected with the piezoelectric power source 96.

The nozzle 80 may be provided to the bottom surface of the cylindrical tank 82. The nozzle 80 may be disposed inside the chamber 16 via a target supply hole, not illustrated, of the chamber 16. The target supply hole of the chamber 16 may be closed when the target supply unit 18 is disposed. With the configuration that the target supply unit 18 is disposed to close the target supply hole of the chamber 16, the inside of the chamber 16 may be isolated from the atmospheric air. At least the internal surface of the nozzle 80 may be configured of a material that resists reaction with the target material.

One end of the pipe-shaped nozzle 80 may be fixed to the hollow tank 82. The other end of the pipe-shaped nozzle 80 may have a nozzle hole 80a. The tank 82 positioned at one end side of the nozzle 80 may be located outside the chamber 16, and the nozzle hole 80a positioned on the other side of the nozzle 80 may be located inside the chamber 16. On an extended line in the center axis direction of the nozzle 80, the plasma generation region 26 located inside the chamber 16 may be positioned. The center axis direction of the nozzle 80 may be a Y axis direction. The tank 82, the nozzle 80, and the chamber 16 may be configured such that the internal parts thereof communicate with each other.

The nozzle hole 80a may be formed in a shape such that a molten target substance is jetted into the chamber 16.

The target supply unit 18 may form a droplet 136 in a continuous jet method, for example. In the continuous jet method, the target may be separated cyclically by giving a standing wave to a flow of jetted targets caused by the vibration of the nozzle 80. The separated target may form a free interface by the own surface tension to thereby form the droplet 136.

The piezoelectric element 88 and the piezoelectric power source 96 may serve as elements constituting a droplet forming mechanism that applies vibration, necessary for forming the droplet 136, to the nozzle 80.

The piezoelectric element 88 may be fixed to the outer side surface of the pipe-shaped nozzle 80. The piezoelectric element 88 fixed to the nozzle 80 may vibrate the nozzle 80. The piezoelectric element 88 may be connected with the piezoelectric power source 96.

The piezoelectric power source 96 may supply electric power to the piezoelectric element 88. The piezoelectric power source 96 may be connected with the control unit 70. The piezoelectric power source 96 may be controlled by the control unit 70 to supply electric power to the piezoelectric element 88.

The droplet detection device 76 may be part or whole of the target sensor 42 illustrated in FIG. 1. The droplet detection device 76 may detect the droplet 136 output into the chamber 16.

The droplet detection device 76 may also include a light source unit 100 and a light receiving unit 120. The light source unit 100 may include a light source 102 and an illumination optical system 104. The light source unit 100 may be disposed to illuminate a droplet at a predetermined position P on the trajectory between the nozzle 80 of the target supply unit 18 and the plasma generation region 26. As the light source 102, a continuous-wave (CW) laser light source may be used. The illumination optical system 104 may include a condensing lens 106 and a window 108.

The beam diameter of continuous laser light radiated to the droplet 136 may be sufficiently larger than the diameter of the droplet 136. The diameter of the droplet 136 may be 20 μm, for example. The condensing lens 106 may be a cylindrical lens.

The light source unit 100 and the light receiving unit 120 may be disposed opposite to each other over a target travel path that is a travel path of the droplet 136 that is a target output into the chamber 16. The opposing direction of the light source unit 100 and the light receiving unit 120 may be orthogonal to the target travel path.

When the droplet 136 traveling through the target travel path reaches the predetermined position P, the illumination light 110 emitted from the light source unit 100 may be radiated to the droplet 136.

The light receiving unit 120 may include a light receiving optical system 122 and an optical sensor 124. The light receiving unit 120 may be disposed to receive the illumination light 110 output from the light source unit 100. The light receiving optical system 122 may include a window 126 and the condensing lens 128. The light receiving optical system 122 may be an optical system such as a collimator, and may be configured of an optical element such as a lens. The light receiving optical system 122 may guide continuous laser light emitted from the light source unit 100, to the optical sensor 124.

The optical sensor 124 may be a light receiving element including a photodiode. The optical sensor 124 may detect light intensity of the continuous laser light guided by the light receiving optical system 122. The optical sensor 124 may be connected with the control unit 70. The optical sensor 124 may supply a detection signal of the detected light intensity, to the control unit 70.

When the droplet 136 passes through the predetermined position P on the target travel path, part of the continuous laser light may be shielded by the droplet 136, whereby the light intensity received by the light receiving unit 120 may be decreased. The light receiving unit 120 may output a detection signal corresponding to a decrease of the light intensity due to passage of the droplet 136, to the control unit 70. A detection signal corresponding to a decrease of the light intensity due to the droplet 136 may also be called a "passage timing signal".

The control unit 70 may detect the timing when the droplet 136 is detected, by a detection signal from the droplet detection device 76. In particular, the control unit 70 may detect the timing when the droplet 136 passes through the predetermined position P on the target travel path.

The timing when the droplet detection device 76 detects the droplet 136 may also be called "passage timing". The passage timing may be timing when the droplet detection device 76 outputs a passage timing signal to the control unit 70.

The EUV light generating device 12 may include a first high reflective mirror 130, a second high reflective mirror 132, and a laser light condensing optical system 134. The laser light travel direction control unit 54 illustrated in FIG. 1 may be configured to include the first high reflective mirror 130 and the second high reflective mirror 132. The laser light condensing optical system 134 may include the laser light condensing mirror 56 illustrated in FIG. 1.

In FIG. 2, it is assumed that a direction of deriving the EUV light 62 from the chamber 16 of the EUV light generating device 12 toward the exposure device 46 is a Z axis. An X axis and a Y axis are axes orthogonal to the Z axis and orthogonal to each other. It is assumed that the dropping direction of a droplet is the Y axis. It should be noted that the drawings of FIG. 3 and after also use the coordinate axes of FIG. 2.

The chamber 16 of the EUV light generating device 12 may be formed in a hollow spherical shape, or a hollow cylindrical shape, for example. The center axis direction of the cylindrical chamber 16 may be a direction of deriving the EUV light 62 to the exposure device 46, that is, the Z axis direction.

The EUV light generation control unit 40 may transmit and receive signals to and from an exposure device control unit, not illustrated, that is a control unit of the exposure device 46. Thereby, the EUV light generation control unit 40 may collectively control operation of the entire EUV light generation system 10 based on an instruction of the exposure device 46. The EUV light generation control unit 40 may also transmit and receive control signals to and from the laser device 14. Thereby, the EUV light generation control unit 40 may control operation of the laser device 14.

The EUV light generation control unit 40 may transmit and receive control signals to and from respective actuators, not illustrated, of the laser light travel direction control unit 54 and the laser light condensing optical system 134. Thereby, the EUV light generation control unit 40 may regulate the travel directions and condensing positions of pulse laser light 21, 22, and 23.

The EUV light generation control unit 40 may also transmit and receive control signals to and from the control unit 70 of the target supply device 78. Thereby, the EUV light generation control unit 40 may control operation of the target supply device 78, the droplet detection device 76, and the laser device 14.

3.2 Operation

Operation of the EUV light generating device 12 will be described with use of FIG. 2. When a target generation signal is input from the EUV light generation control unit 40, the control unit 70 may control the heater 84 via the temperature controller 94 such that the temperature of the target material in the target supply unit 18 becomes a predetermined temperature equal to or higher than the melting point. The temperature controller 94 may control the heater power source 92 based on a detection value of the temperature sensor 86, in accordance with control by the control unit 70. In the case where tin (Sn) is used as a target material, the control unit 70 may control the heater 84 such that the temperature of the tin in the target supply unit 18 becomes a predetermined temperature in a range from 200° C. to 300° C., for example. As a result, the tin stored in the target supply unit 18 may be molten. The molten tin may correspond to a form of a "liquid target substance".

The control unit 70 may transmit an electric signal having a predetermined piezoelectric drive frequency and predetermined duty, to the piezoelectric element 88 via the piezoelectric power source 96, such that the liquid tin output from the nozzle 80 generates the droplet 136.

The piezoelectric power source 96 may supply electric power for driving to the piezoelectric element 88, in accordance with an instruction from the control unit 70. As a result, the nozzle 80 may be vibrated by the piezoelectric element 88.

The control unit 70 may control the pressure regulator 90 to be in a predetermined pressure such that a droplet reaches the plasma generation region 26 at a predetermined velocity. As a result, jetted liquid tin is output from the nozzle hole 80a, and the droplet 136 may be generated with the vibration of the nozzle hole 80a. Then, the droplet 136 may be supplied to the plasma generation region 26.

When the droplet 136 passes through the predetermined position P on the trajectory between the nozzle hole 80a and the plasma generation region 26, the quantity of illumination light made incident on the optical sensor 124 of the light receiving unit 120 is decreased. The light receiving unit 120 may generate a passage timing signal during a period that the light quantity received by the optical sensor 124 is equal to or less than a predetermined threshold.

The passage timing signal output from the light receiving unit 120 may be input to the delay circuit 72 via the control unit 70.

The delay circuit 72 may generate a light emission trigger signal by adding a delay time to the passage timing signal, and input the signal to the laser device 14. The delay time of the delay circuit 72 may be set such that the light emission trigger signal is input to the laser device 14 before the droplet 136 passes through the predetermined position P and reaches the plasma generation region 26. This means that the delay time may be set such that pulse laser light output from the laser device 14 is radiated to the droplet 136 when the droplet 136 reaches the plasma generation region 26.

The pulse laser light output from the laser device 14 may be guided to the plasma generation region 26 via the first high reflective mirror 130, the second high reflective mirror 132, and the laser light condensing optical system 134, and be radiated to the droplet 136. The plasma generation region 26 may correspond to the condensing position of the pulse laser light.

4. Description of Light Emission Trigger Control System of Laser Device

4.1 Configuration

Figure 3:
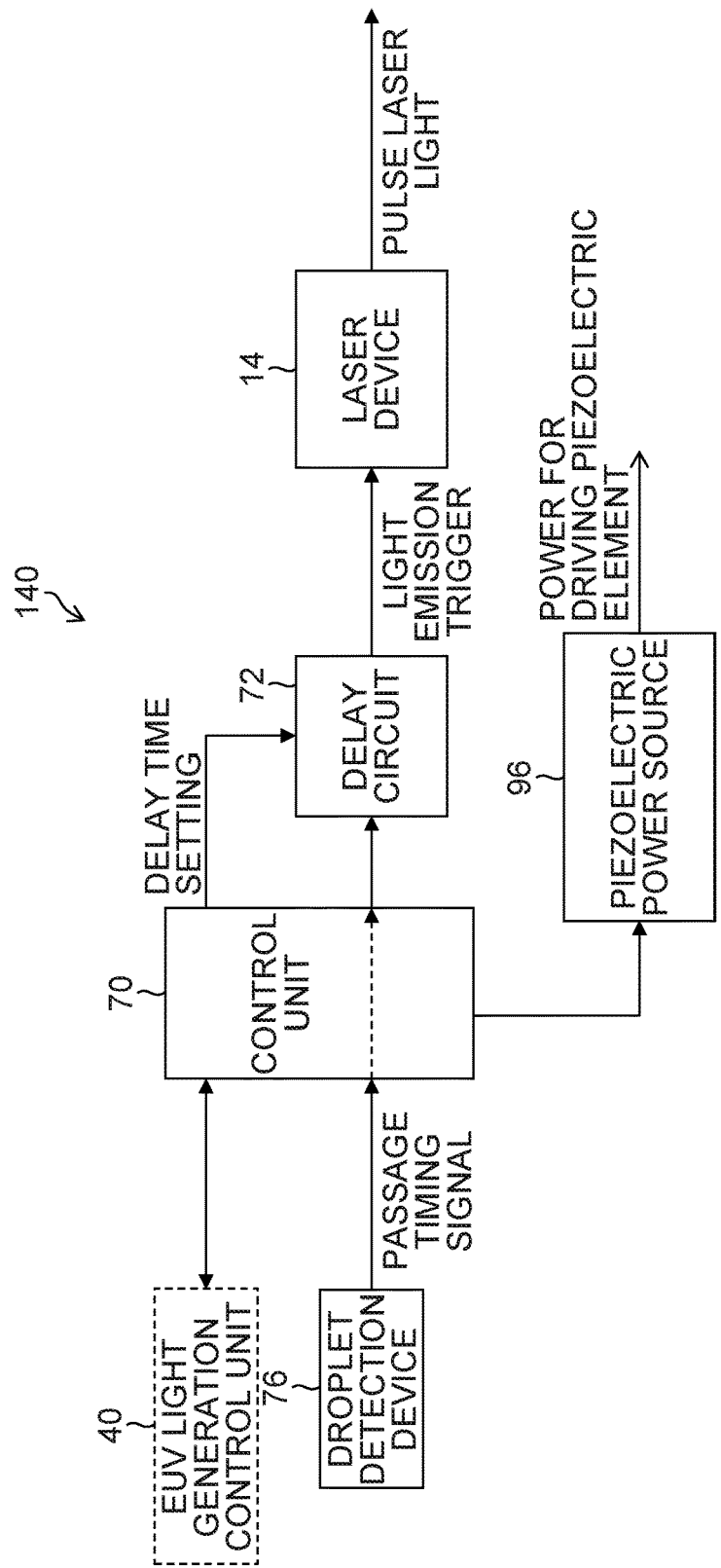
FIG. 3 is a block diagram illustrating a configuration of a control system that controls a light emission trigger of a laser device.

FIG. 3 illustrates a configuration of a control system that controls a light emission trigger of the laser device 14. A control system 140 may include the droplet detection device 76, the control unit 70, the delay circuit 72, and the laser device 14.

The delay circuit 72 may be configured as part of the control unit 70. A passage timing signal that is an output signal of the droplet detection device 76 may be input to the delay circuit 72 via the control unit 70. A line for setting the delay time of the delay circuit 72 by the control unit 70 may be connected with the delay circuit 72. An output of the delay circuit 72 may be input to the laser device 14 as a light emission trigger signal.

4.2 Operation

When the control unit 70 receives a droplet generation signal from the EUV light generation control unit 40, the control unit 70 may transmit data for setting a delay time $t_d$ to the delay circuit 72. The control unit 70 may receive a passage timing signal of a droplet from the droplet detection device 76, and input the signal to the delay circuit 72.

The delay circuit 72 may input a signal delayed by the delay time to relative to the passage timing signal, to the laser device 14 as a light emission trigger signal.

Figure 4:
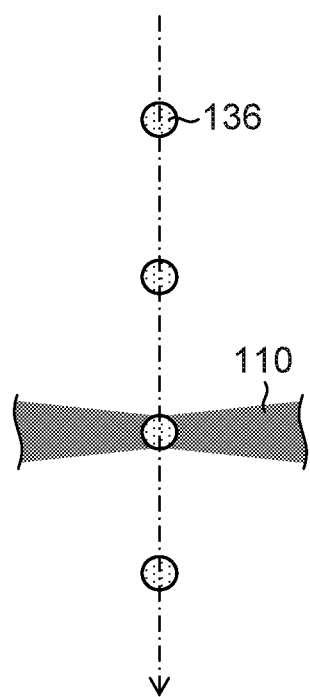
FIG. 4 schematically illustrates a state of droplet passing through a detection range of a droplet detection device when a droplet is normally generated.

FIG. 4 schematically illustrates a state of droplets passing through a detection range of the droplet detection device 76 when droplets are normally generated. Further, FIG. 5 is a timing chart of passage timing signals and light emission trigger signals obtained when droplets are normally generated.

As illustrated in FIG. 4, when the droplets 136 are generated normally, the droplets 136 pass through the detection range of the droplet detection device 76 with almost equal intervals. Accordingly, as illustrated in the upper stage of FIG. 5, time intervals T(1) to T(n) of the passage timing may be in an almost equal cycle Tc. The cycle Tc may be natural number times the inverse number of a predetermined piezoelectric drive frequency $f_p$. This means that the cycle Tc may be substantially represented as $m/f_p$, where m represents a natural number. In the present example, the timing when the pulse of a passage timing signal rises is set as "passage timing". A time interval of passage timing is called "passage timing interval". This means that a time interval of signals may be measured from an interval of timing when a pulse rises.

Figure 5:
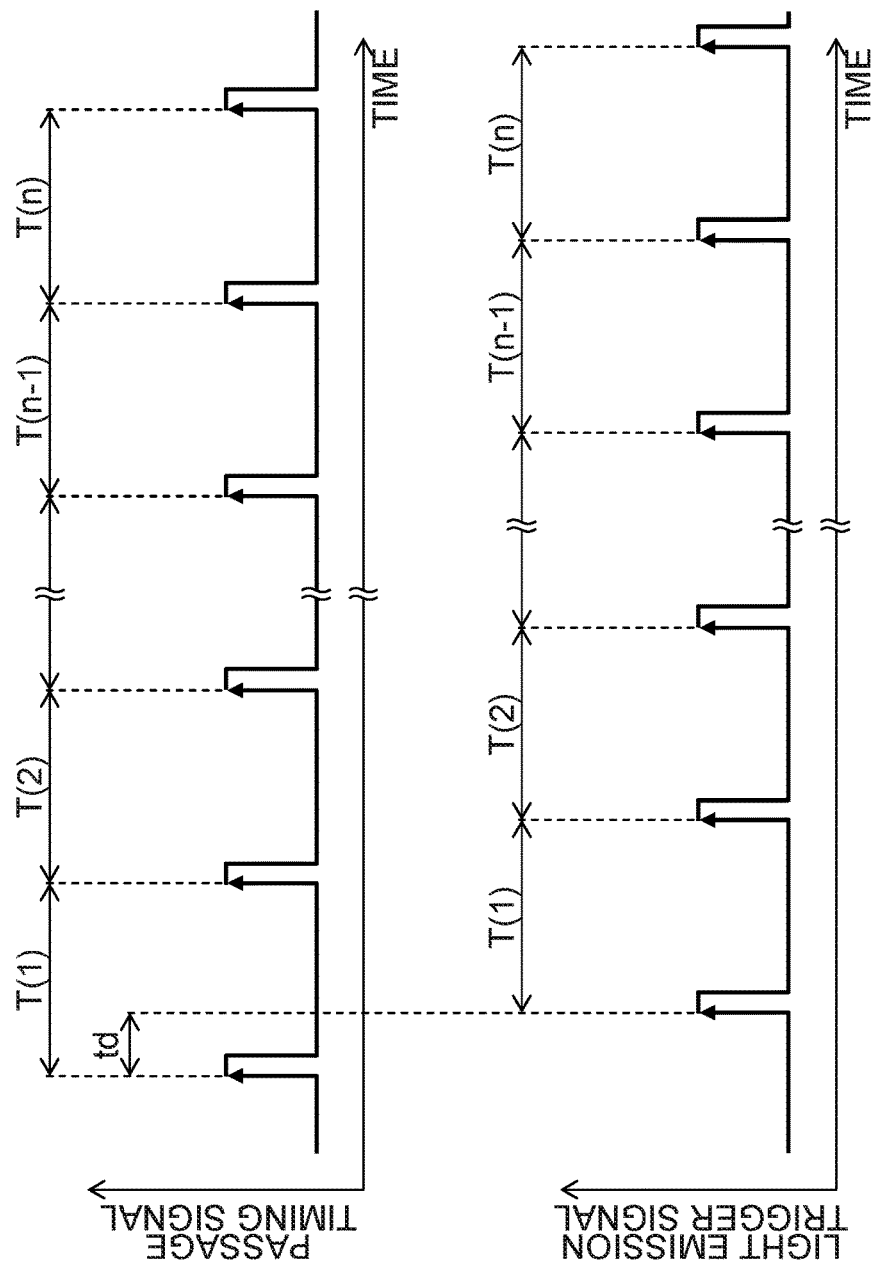
FIG. 5 is a timing chart of a passage timing signal and a light emission trigger signal obtained when a droplet is normally generated.

As illustrated in the lower stage of FIG. 5, a light emission trigger signal may be generated in the almost same cycle Tc as that of a passage timing signal, with a delay from the passage timing signal by the delay time $t_d$. When the light emission trigger signal illustrated in the lower stage of FIG. 5 is supplied to the laser device 14, the laser device 14 outputs laser light with almost constant time intervals. As such, the temperature of an excitation medium becomes asymptotic almost constantly, whereby the pulse energy of the output laser light becomes stable.

5. Problem

Figure 6:
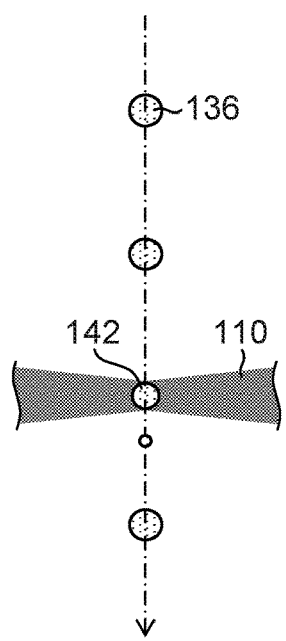
FIG. 6 schematically illustrates a state of a droplet passing through a detection range of a droplet detection device when a faulty coalesced droplet is generated.
Figure 7:
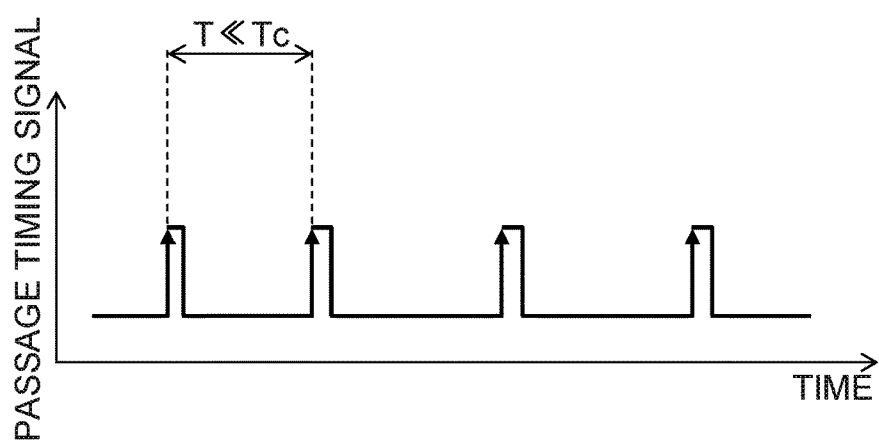
FIG. 7 is a timing chart of a passage timing signal obtained when a faulty coalesced droplet is generated.

FIG. 6 schematically illustrates a state of droplets passing through a detection range of the droplet detection device 76 when a faulty coalesced droplet is generated. FIG. 7 is an exemplary timing chart of passage timing signals obtained when a faulty coalesced droplet is generated. In FIG. 7, the second passage timing signal from the left is a signal of a faulty coalesced droplet.

Figure 8:
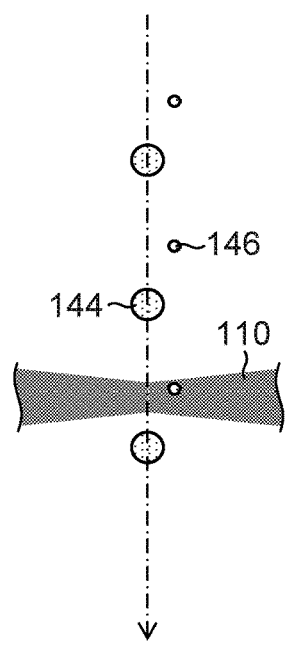
FIG. 8 schematically illustrates a state of a droplet passing through a detection range of a droplet detection device when a satellite is generated.
Figure 9:
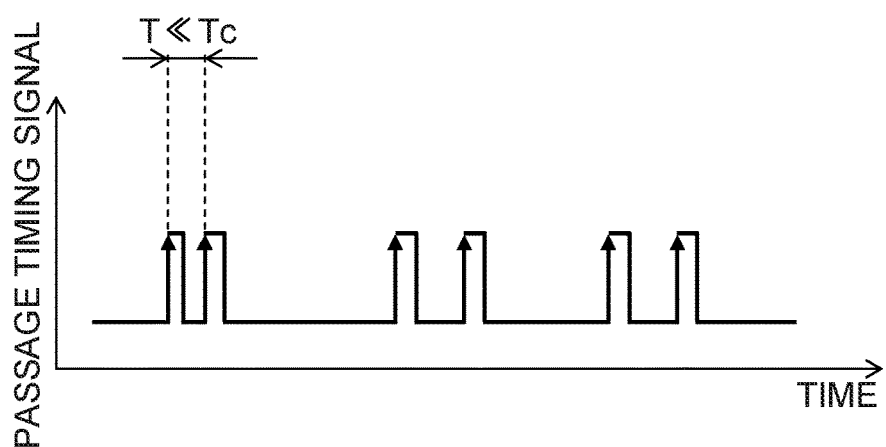
FIG. 9 is an exemplary timing chart of a passage timing signal obtained when a satellite is generated.

FIG. 8 schematically illustrates a state of droplets passing through a detection range of the droplet detection device 76 when a satellite is generated. FIG. 9 is an exemplary timing chart of passage timing signals obtained when a satellite is generated. In FIG. 9, the second passage timing signal from the left is a signal of a satellite. Further, the fourth and the sixth passage timing signals from the left are also signals of satellites, respectively.

When a drive signal of a rectangular wave having a piezoelectric drive frequency $f_p$ is applied from the piezoelectric power source 96 to the piezoelectric element 88, tin droplets may be continuously discharged from the nozzle 80. Regarding the droplets discharged from the nozzle 80, a plurality of droplets coalesce together during falling, and then may be detected by the droplet detection device 76.

Due to some reasons, a faulty coalesced droplet 142 may be generated as illustrated in FIG. 6, or a satellite 146 may be generated near a large droplet 144 as illustrated in FIG. 8.

When the droplet detection device 76 detects the faulty coalesced droplet 142 or the satellite 146, the droplet detection device 76 may generate a passage timing signal with a time interval that is different from the cycle Tc. A passage timing signal corresponds to a droplet detection signal.

A light emission trigger signal may be a signal delayed by the delay time to from a passage timing signal by the delay circuit 72. For example, as illustrated in FIGS. 7 and 9, when a time interval T of continuous passage timing signals is T<<Tc, a time interval of light emission trigger signals input to the laser device 14 becomes shorter than the cycle Tc, which may cause problems as described below.

[Problem 1] Pulse energy of pulse laser light output from the laser device 14 may be lowered. As a result, pulse energy of EUV light may also be lowered.

[Problem 2] A pulse waveform of pulse laser light output from the laser device 14 may be changed. As a result, pulse energy of EUV light may also be changed.

[Problem 3] The laser device 14 may be damaged.

The aforementioned problems 1 to 3 may also be caused when T>>Tc, for example. Respective embodiments provided below can solve at least one of the problems 1 to 3.

6. First Embodiment: Description of Target Supply Device According to First Embodiment

6.1 Configuration

Figure 10:
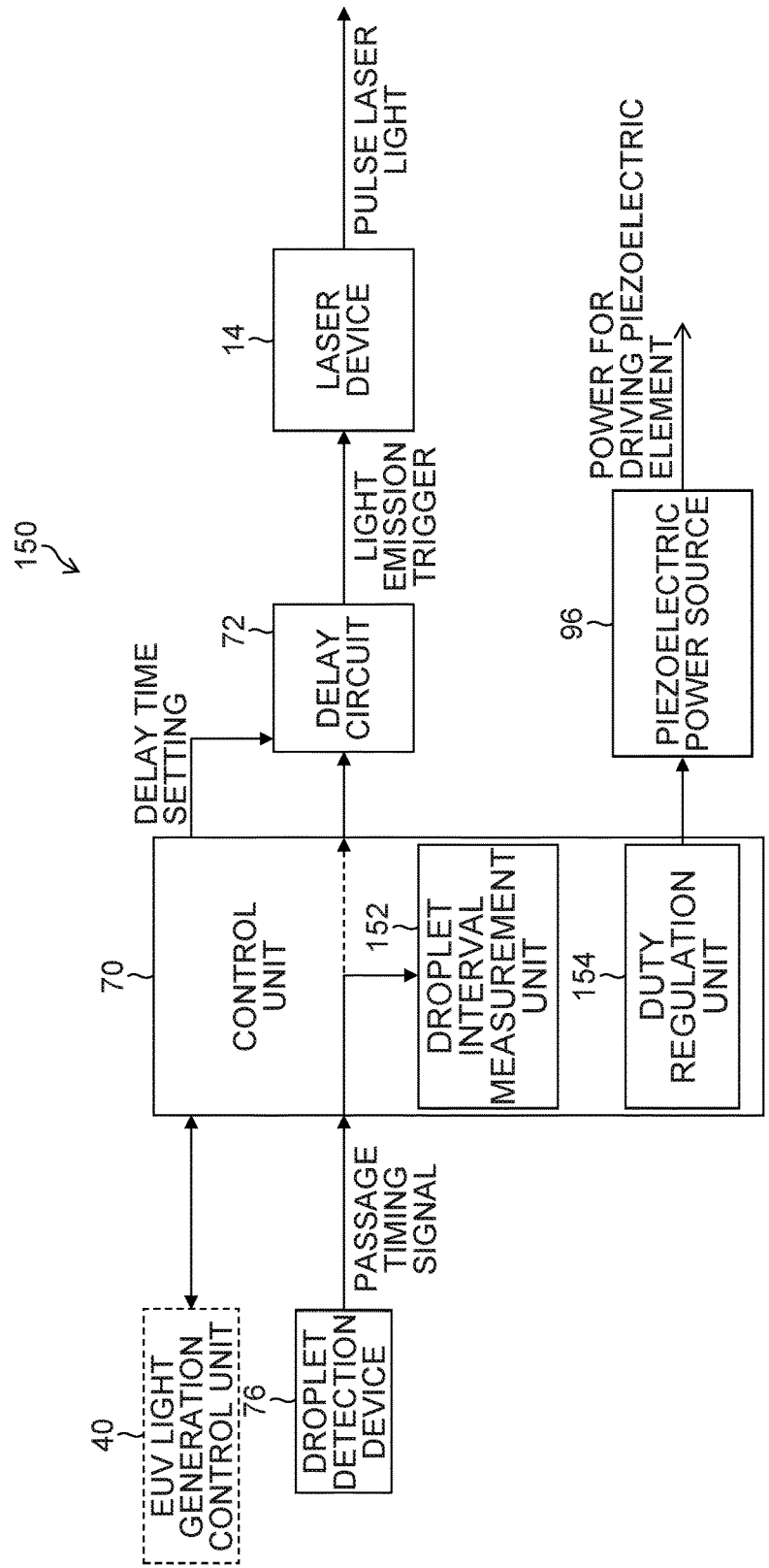
FIG. 10 is a block diagram illustrating a configuration of a control system of a target supply device according to a first embodiment.

FIG. 10 is a block diagram illustrating a configuration of a control system in a target supply device according to a first embodiment. The target supply device of the first embodiment may adopt a control system 150 illustrated in FIG. 10, instead of the control system 140 illustrated in FIG. 3.

The control unit 70 may include a droplet interval measurement unit 152 and a duty regulation unit 154. The control unit 70 may include a storage unit, not illustrated, for storing various types of data required for control and arithmetic processing.

The droplet interval measurement unit 152 may be a circuit that measures a passage timing interval of droplets from passage timing signals generated by the droplet detection device 76. Alternatively, the droplet interval measurement unit 152 may be a program described to calculate a passage timing interval of droplets from passage timing signals, stored inside the control unit 70, and executable by the control unit 70. The droplet interval measurement unit 152 may correspond to a form of a "passage time interval measurement unit" that measures passage time interval of droplets. The droplet detection device 76 may correspond to a form of a "droplet detection unit".

The duty regulation unit 154 may be a circuit that outputs a signal to the piezoelectric power source 96 based on a duty value designated by the control unit 70. Alternatively, the duty regulation unit 154 may be configured of an external device capable of supplying a signal waveform to the piezoelectric power source 96 based on a duty value designated by the control unit 70, that is, a function generator, for example.

6.2 Operation

The control unit 70 may set Tmin serving as an interval basis of a passage timing signal. Tmin may be stored in a storage device not illustrated, or may be input by an operator. Tmin may be determined based on a light emission trigger signal interval with which output of the laser device 14 is unstable. Tmin may be held in a plurality of numbers in association with repetition frequencies of a plurality of units of EUV light. Tmin may correspond to a form of a "reference value of a passage time interval".

The droplet interval measurement unit 152 may measure a passage timing interval T of each droplet when a passage timing signal is input.

The control unit 70 may compare the passage timing interval T measured by the droplet interval measurement unit 152 with Tmin, and when T<Tmin, that is, when the passage timing interval T is less than Tmin, the control unit 70 may execute duty regulation of a piezoelectric drive signal. "Duty regulation" is a process of regulating the duty of an electric signal of a rectangular wave applied from the piezoelectric power source 96 to the piezoelectric element 88.

When T≥Tmin, the control unit 70 may generate a light emission trigger signal. The control unit 70 may continue comparison with Tmin each time the passage timing interval T measured by the droplet interval measurement unit 152 is input. During this period, the EUV light generating device 12 may output EUV light.

Further, when generation of EUV light is temporarily stopped due to any reason, the control unit 70 may generate a light emission trigger signal after performing duty regulation when resuming generation of EUV light.

Figure 11:
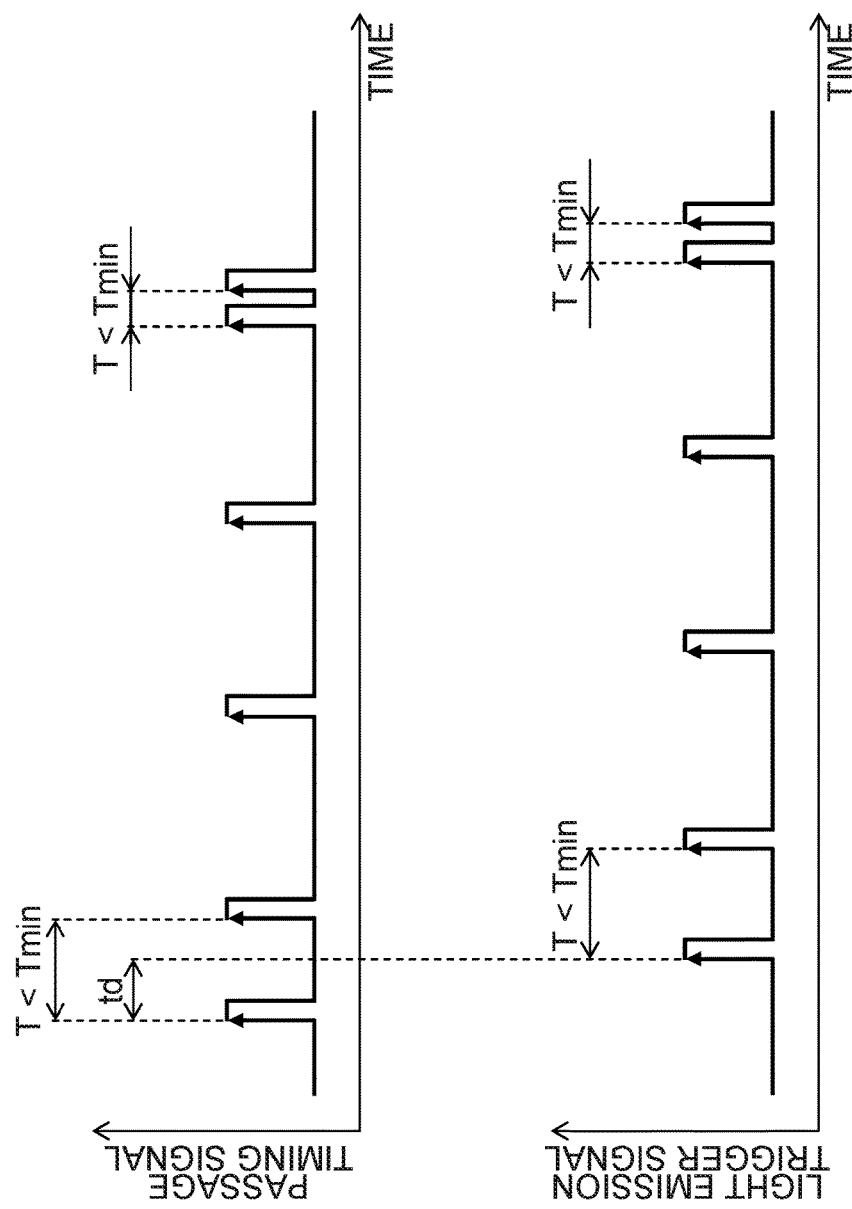
FIG. 11 is an exemplary timing chart of a passage timing signal and a light emission trigger signal obtained when a faulty coalesced droplet or a satellite is generated.

FIG. 11 is an exemplary timing chart of a passage timing signal and a light emission trigger signal obtained when a faulty coalesced droplet or a satellite is generated. When a faulty coalesced droplet is generated or a satellite is generated due to some reasons, the passage timing interval T may satisfy T<Tmin, as illustrated in FIG. 11.

In the timing chart of passage timing signals illustrated in the upper stage of FIG. 11, the second passage timing signal from the left is a signal detecting passage of a faulty coalesced droplet. Further, the sixth passage timing signal from the left is a signal detecting a satellite.

The control unit 70 may monitor generation of a faulty coalesced droplet or generation of a satellite by determining whether T<Tmin is satisfied.

Figure 12:
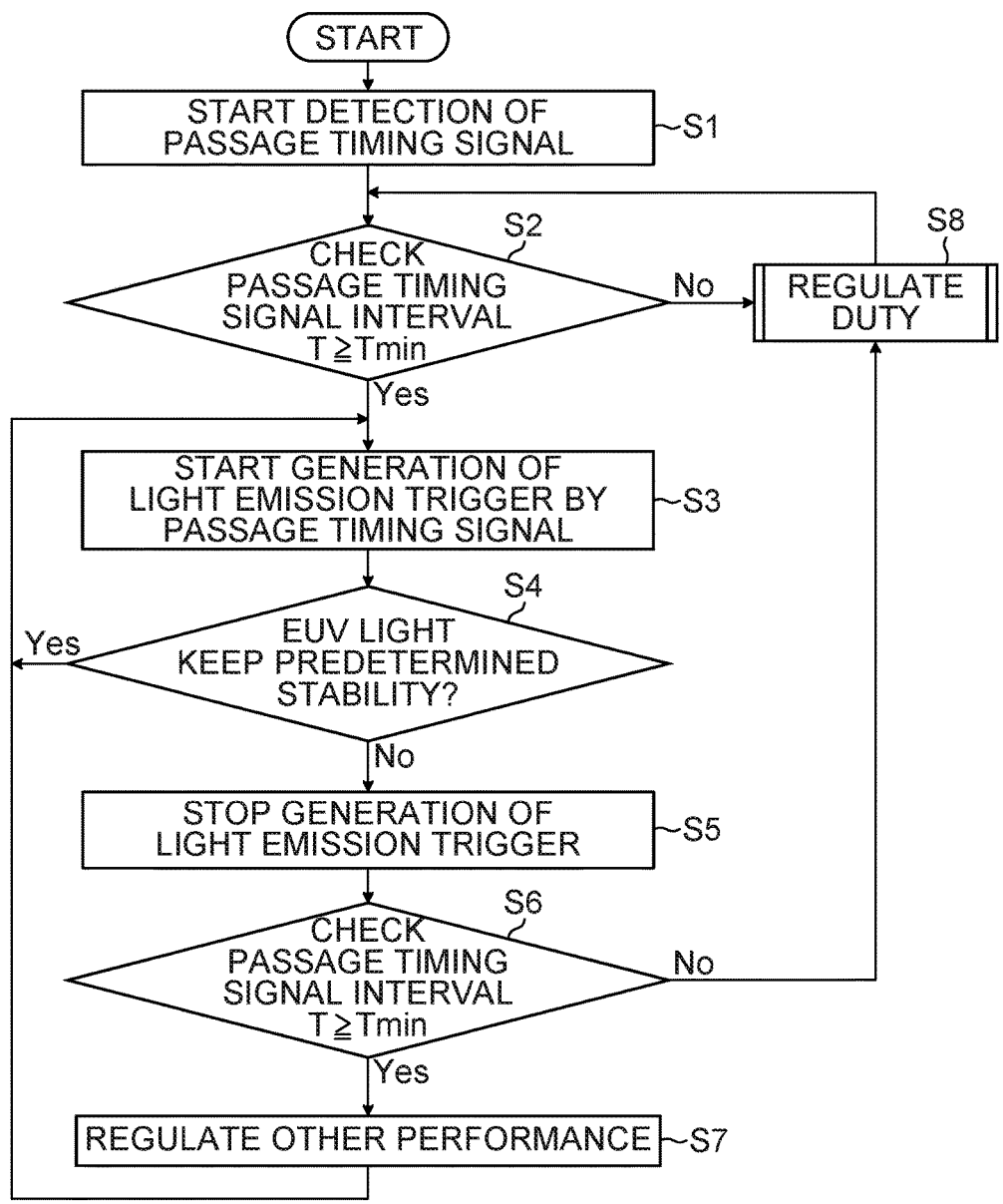
FIG. 12 is a flowchart illustrating an exemplary operation of the control unit illustrated in FIG. 10.

FIG. 12 is a flowchart illustrating an exemplary operation of the control unit 70. When a start signal is input from the EUV light generation control unit 40 to a target supply device 78, the control unit 70 may start the processes illustrated in the flowchart of FIG. 12.

At step S1, the control unit 70 may start detection of a passage timing signal.

At step S2, the control unit 70 may check whether or not the passage timing interval T is equal to or greater than Tmin that is previously set. In the passage timing interval checking step of step S2, when the control unit 70 identifies that T≥Tmin is satisfied, the control unit 7 may move to step S3. Meanwhile, at step S2, when the control unit 70 determines that T≥Tmin is not satisfied, that is, when the control unit 70 determines that T<Tmin is satisfied, the control unit 70 may move to step S8.

At step S3, the control unit 70 may start generation of a light emission trigger by a passage timing signal. When generation of a light emission trigger is started, the delay circuit 72 may generate a light emission trigger by giving a delay of a predetermined delay time $t_d$ to a passage timing signal.

At step S4 following step S3, the control unit 70 may determine whether or not the EUV light generated by the EUV light generating device 12 keeps predetermined stability. The control unit 70 may perform determination of step S4 based on a signal obtained from the EUV light generation control unit 40.

The EUV light generating device 12 may temporarily stop generation of EUV light due to unexpected quality deterioration or the like of the EUV light to perform regulation of respective units. At that time, generation of a light emission trigger may be stopped. For example, within one burst, when variation in the EUV light energy exceeds ±2% in the moving average of a certain number of pulses, a light emission trigger stop signal may be input to the control unit 70. Burst operation will be described below with use of FIG. 13.

At step S4 of FIG. 12, when the control unit 70 determines that the EUV light generated by the EUV light generating device keeps predetermined stability, the control unit 70 may return to step S3. On the other hand, when the control unit 70 determines, at step S4, that EUV light does not keep predetermined stability due to input of a light emission trigger stop signal from the EUV light generation control unit 40 to the control unit 70, for example, the control unit 70 may move to step S5.

At step S5, the control unit 70 may stop generation of a light emission trigger. When generation of a light emission trigger is stopped, output of pulse laser light from the laser device 14 is stopped, and generation of EUV light is stopped.

In the case of resuming generation of EUV light, the control unit 70 checks an interval between passage timing signals at step S6, and when T<Tmin, the control unit 70 may perform duty regulation of step S8. At step S8, the control unit 70 may regulate duty of an electric signal of a rectangular wave for driving the piezoelectric element 88. The duty regulation of step S8 will be described below with use of FIG. 14.

At step S2 or step S6, when the control unit 70 determines that T<Tmin, the control unit 70 may perform duty regulation of step S8.

On the other hand, when the passage timing interval T satisfies T≥Tmin at step S6, the control unit 70 may move to step S7.

At step S7, the control unit 70 may perform performance regulation other than duty regulation of step S8. After step S7, the control unit 70 may return to step S3 and resume generation of a light emission trigger. The flowchart of FIG. 12 can be ended at any timing by an interruption process from the EUV light generation control unit 40.

Figure 13:
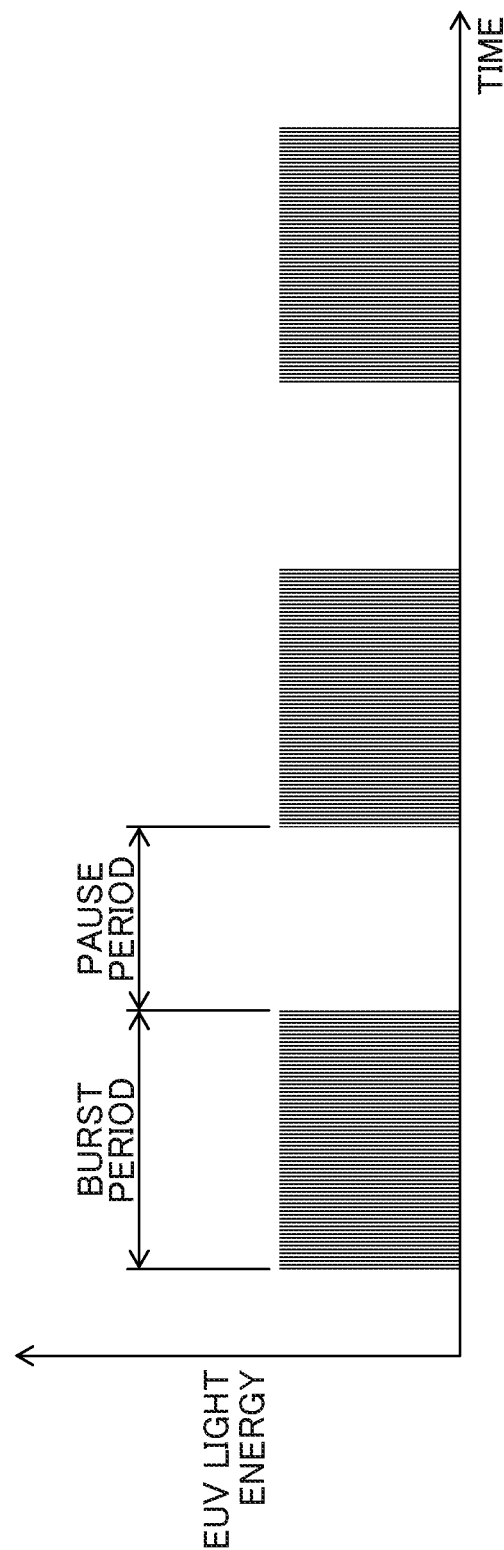
FIG. 13 illustrates a burst operation of an EUV light generating device.

FIG. 13 illustrates a burst operation. The EUV light generation system 10 may output EUV light by a burst operation. A burst operation is an operation in which a burst period during which EUV light is output at a certain repetition frequency for a given period and a pause period during which EUV light is not output for a given period are repeated. One burst period may be referred to as one burst.

During a burst period, laser light may be output from the laser device 14. During a pause period, output of laser light from the laser device 14 may be stopped. Alternatively, during a pause period, propagation of laser light to the plasma generation region 26 may be prevented.

A burst pattern may be defined by data including any or some of EUV light energy in a burst period, a repetition frequency, the number of pulses, and the length of a burst pause period. A burst pattern may be instructed by the exposure device 46.

Figure 14:
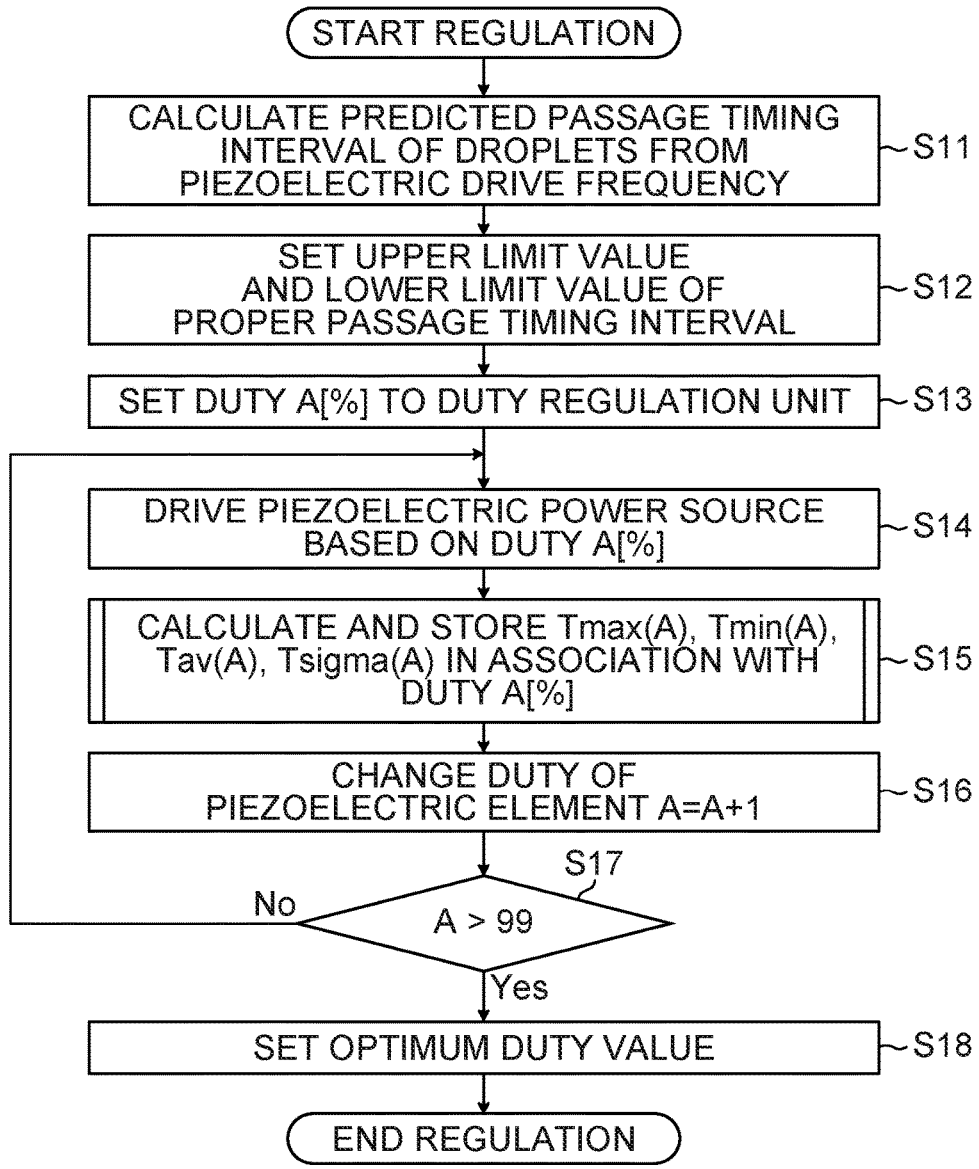
FIG. 14 is a flowchart illustrating contents of a process of duty regulation in the first embodiment.

FIG. 14 is a flowchart illustrating contents of a process of duty regulation in step S8 of FIG. 12.

When the process of duty regulation is started, the control unit 70 may calculate a predicted passage timing interval of droplets from the drive frequency of the piezoelectric element 88 at step S11. "Predicted passage timing interval" means a time interval of predicted passage timing of droplets calculated from the drive frequency of the piezoelectric element.

The predicted passage timing interval may correspond to a form of a "predicted passage time interval". The predicted passage timing interval may serve as a standard of a proper passage time interval of droplets.

At step S12, the control unit 70 may set an upper limit value and a lower limit value of a proper passage timing interval of droplets. For example, the control unit 70 may set values of "±15%" of a predicted passage timing interval calculated at step S11, as an upper limit value and a lower limit value. This means that the control unit 70 may set ±15% of a predicted passage timing interval as a proper range of a droplet passage timing interval. The process shown in step S12 may correspond to a form of a "process of setting a proper range of a passage time interval". The proper range of a droplet passage timing interval may be a range allowable as a proper passage time interval of droplets.

At step S13, the control unit 70 may set a duty value of the duty regulation unit 154 to A %. Here, "A" represents a variable parameter of a duty value. The control unit 70 may set A to 1% as an initial value, for example.

At step S14, the duty regulation unit 154 may drive the piezoelectric power source 96 based on the set duty A. By driving the piezoelectric power source 96 based on the setting of the duty A, a droplet may be generated and a passage timing signal may be output from the droplet detection device 76.

The droplet interval measurement unit 152 may measure passage timing intervals T(1), T(2), . . . T(N) of respective droplets when passage timing signals are input. N represents the number of times of measuring passage timing intervals. N takes any natural number that can be set in advance. For example, N may be 3 or larger but 50 or smaller. As an example, N=5 may be established. As for a natural number k, a passage timing interval T(k) may be defined by a time interval t(k+1)-t(k), where t(k) represents passage timing of the k-th droplet and t(k+1) represents passage timing of the (k+1)-th droplet. Each of the passage timing intervals T(1), T(2), . . . T(N) measured by the droplet interval measurement unit 152 may correspond to a form of a "passage time interval measurement value".

At step S15, the control unit 70 may store the passage timing intervals T(1), T(2), . . . T(N) measured by the droplet interval measurement unit 152. Further, the control unit 70 may calculate a maximum passage timing interval Tmax, a minimum passage timing interval Tmin, an average value Tav of passage timing intervals, and variation Tsigma of passage timing intervals, from the respective passage timing intervals T(1), T(2), ... T(N). Tsigma may be a 3σ value of a standard deviation. A 3σ value of a standard deviation indicates a value of "3×σ" when the standard deviation is σ.

At step S15, the control unit 70 may associate the calculated Tmax, Tmin, Tav, and Tsigma with the duty A, and store them as Tmax(A), Tmin(A), Tav(A), and Tsigma(A), respectively. The process according to step S15 will be described below with use of FIG. 15.

The control unit 70 may perform the processes of steps S14 and S15 for each duty value by sequentially changing the setting of the duty A by 1% from 1% to 99%, for example.

This means that, at step S16, the control unit 70 may change the duty A of the piezoelectric power source 96 that drives the piezoelectric element 88, to A+1. Through step S16, the value of A+1 is newly set as the duty A. After step S16, the control unit 70 may move to step S17.

At step S17, the control unit 70 may determine whether or not the duty A exceeds 99%. When determining that the duty A is 99% or smaller at step S17, the control unit 70 may return to step S14. The process from step S14 to step S17 may be repeated until the duty A exceeds 99%.

When determining that the duty A exceeds 99% at step S17, the control unit 70 may move to step S18.

At step S18, the control unit 70 may determine an optimum value of the duty, based on the data stored in association with the duty A, and set the determined optimum value as an optimum duty value in the duty regulation unit 154.

The control unit 70 may extract a data group in which Tmax(A), Tmin(A), and Tav(A) are in the proper range of droplet passage timing intervals, from the stored data, and determine the duty A having the minimum Tsigma(A) in the extracted data group to be an optimum value. The proper range of the droplet passage timing interval may be a range defined by the upper limit value and the lower limit value determined at step S12.

At step S18, when the optimum duty value is set, the control unit 70 may end the regulation process of FIG. 14, and return to the flowchart of FIG. 12.

Then, the duty regulation unit 154 may drive the piezoelectric power source 96 based on the set duty.

As described above, the control unit 70 may perform the process of step S15 for respective duty values while changing the duty value at step S16. Such a configuration may correspond to a form of a "process of storing a passage time interval measurement value of droplets generated at respective duty values and variation in the passage time interval measurement values, in association with duty values". Each of Tmax(A) and Tmin(A) stored by the control unit 70 at step S15 may correspond to a form of a "passage time interval measurement value" stored in association with a duty value.

The "optimum duty value" determined by the control unit 70 at step S18 may correspond to a form of an "operation duty value that is a duty value of an electric signal suitable for operation of an excitation element". The process of step S18 may correspond to a form of a "process of determining an operation duty value".

Figure 15:
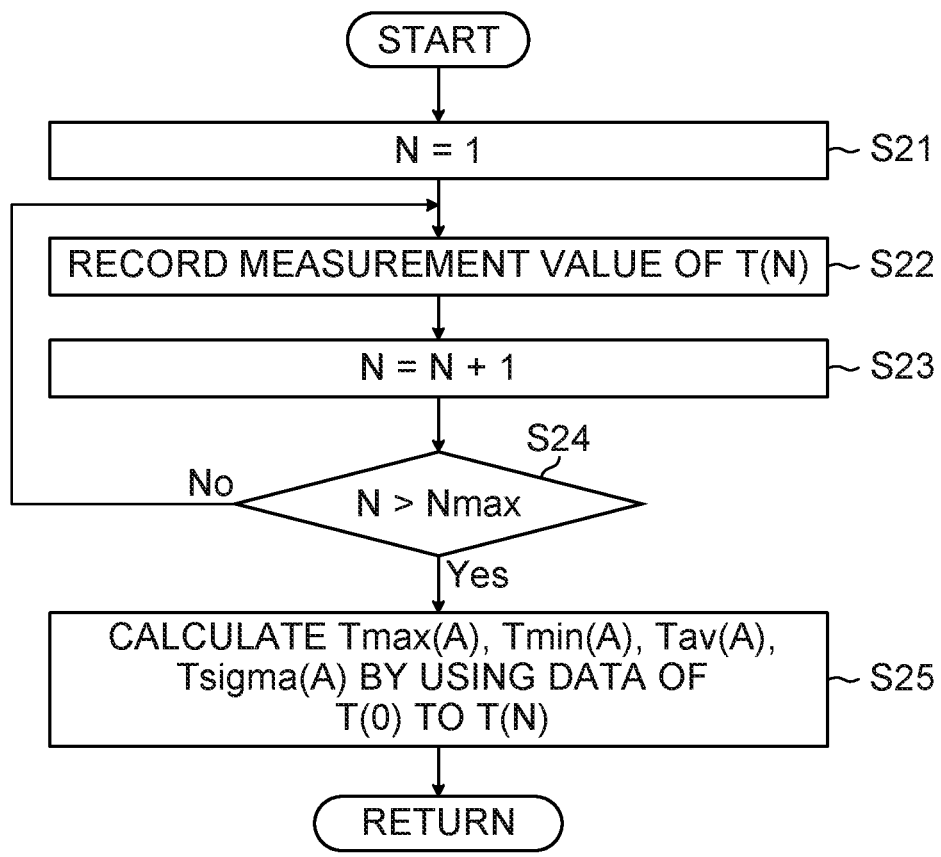
FIG. 15 is a flowchart illustrating a process performed at step S15 of FIG. 14.

FIG. 15 is a flowchart illustrating a process performed at step S15 of FIG. 14. At step S21 of FIG. 15, the control unit 70 may set a parameter N to 1 as an initial value.

At step S22, the droplet interval measurement unit 152 may record a measurement value of the passage timing interval T(N).

At step S23, the control unit 70 may increment the value of N by 1 and newly set the value of N+1 as a value of the parameter N.

At step S24, the control unit 70 may determine whether or not the value of N exceeds Nmax that is a prescribed value previously set. Nmax may be set to any integer larger than the maximum number of measurement times of the passage timing intervals. For example, Nmax may be set to an appropriate value within a range from 4 to 51.

When determining that N≤Nmax at step S24, the control unit 70 may return to step S22.

On the other hand, when determining that N>Nmax at step S24, the control unit 70 may move to step S25.

At step S25, the control unit 70 may use data of T(1) to T(N) to calculate Tmax(A), Tmin(A), Tav(A), and Tsigma (A). The control unit 70 may store the calculated Tmax(A), Tmin(A), Tav(A), and Tsigma(A).

After step S25, the control unit 70 may return to the flowchart of FIG. 14.

Figure 16B:
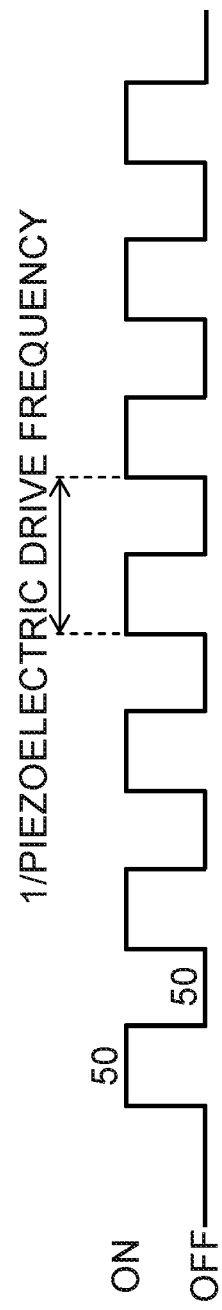
FIG. 16B is a waveform chart illustrating an example of a rectangular wave signal of duty 50%.

FIGS. 16A and 16B illustrate examples of changes in the duty of an electric signal for driving the piezoelectric element. FIG. 16A illustrates an example of a rectangular wave supplied from the duty regulation unit 154 to the piezoelectric power source 96 when the duty is 25%. FIG. 16B illustrates an example of a rectangular wave supplied from the duty regulation unit 154 to the piezoelectric power source 96 when the duty is 50%.

First, duty is determined according to the ratio of a time in which a rectangular wave is ON, with reference to a cycle t calculated according to an expression provided below.

$t=1/(\text{piezoelectric drive frequency})$

The control unit 70 may change the duty by changing the ON time of the rectangular wave supplied from the duty regulation unit 154 to the piezoelectric power source 96, and measure the passage timing interval of droplets for each duty value. Further, the control unit 70 may calculate the variation Tsigma of the passage timing intervals for each duty value. For example, the control unit 70 may perform measurement of the passage timing intervals and calculation of variation or the like, for each duty value within a range of duty from 1% to 99%. Then, the control unit 70 may set a duty value with which the measured passage timing interval is within a proper range defined by the upper limit value and the lower limit value and Tsigma is the smallest, as an optimum operation duty value.

6.3 Effect

According to the first embodiment, even when a faulty coalesced droplet or a satellite is generated, it is possible to apply a duty value of a piezoelectric drive waveform with which such generation is detectable and proper droplet output can be made. Thereby, it is possible to suppress generation of a faulty coalesced droplet or a satellite, and to suppress a decrease in the EUV light energy and breakage of a laser device.

Figure 17:
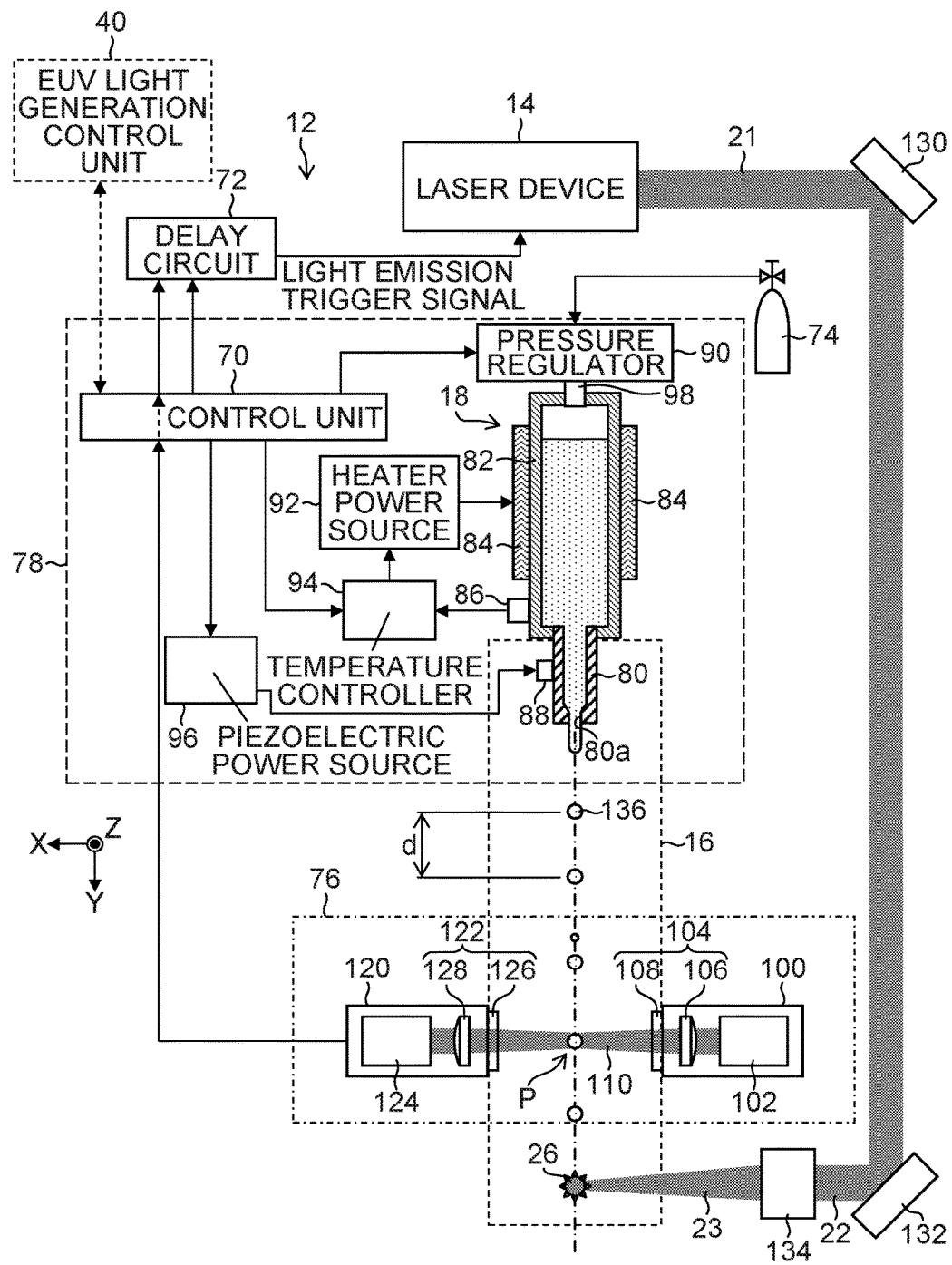
FIG. 17 schematically illustrates a configuration of an EUV light generating device including a target supply device of a second embodiment.

7. Second Embodiment: Description of Target Supply Device According to Second Embodiment 7.1 Configuration FIG. 17 illustrates a configuration of a second embodiment. FIG. 17 differs from FIG. 2 in that description of a droplet interval d of droplets 136, continuously discharged from a nozzle 80, is added.

The second embodiment may adopt a process described below, instead of processing a passage timing signal in the control unit 70 described in the first embodiment. This means that the control unit 70 of the second embodiment may calculate a distance between droplets, that is, the droplet interval d that is a spatial interval, from the time interval of passage timing of droplets. The droplet interval representing a distance between droplets has the same meaning as an "inter-droplet distance" or a "droplet space".

7.2 Operation

As a main flowchart of the second embodiment, the same flowchart as that of FIG. 12 may be adopted.

Figure 18:
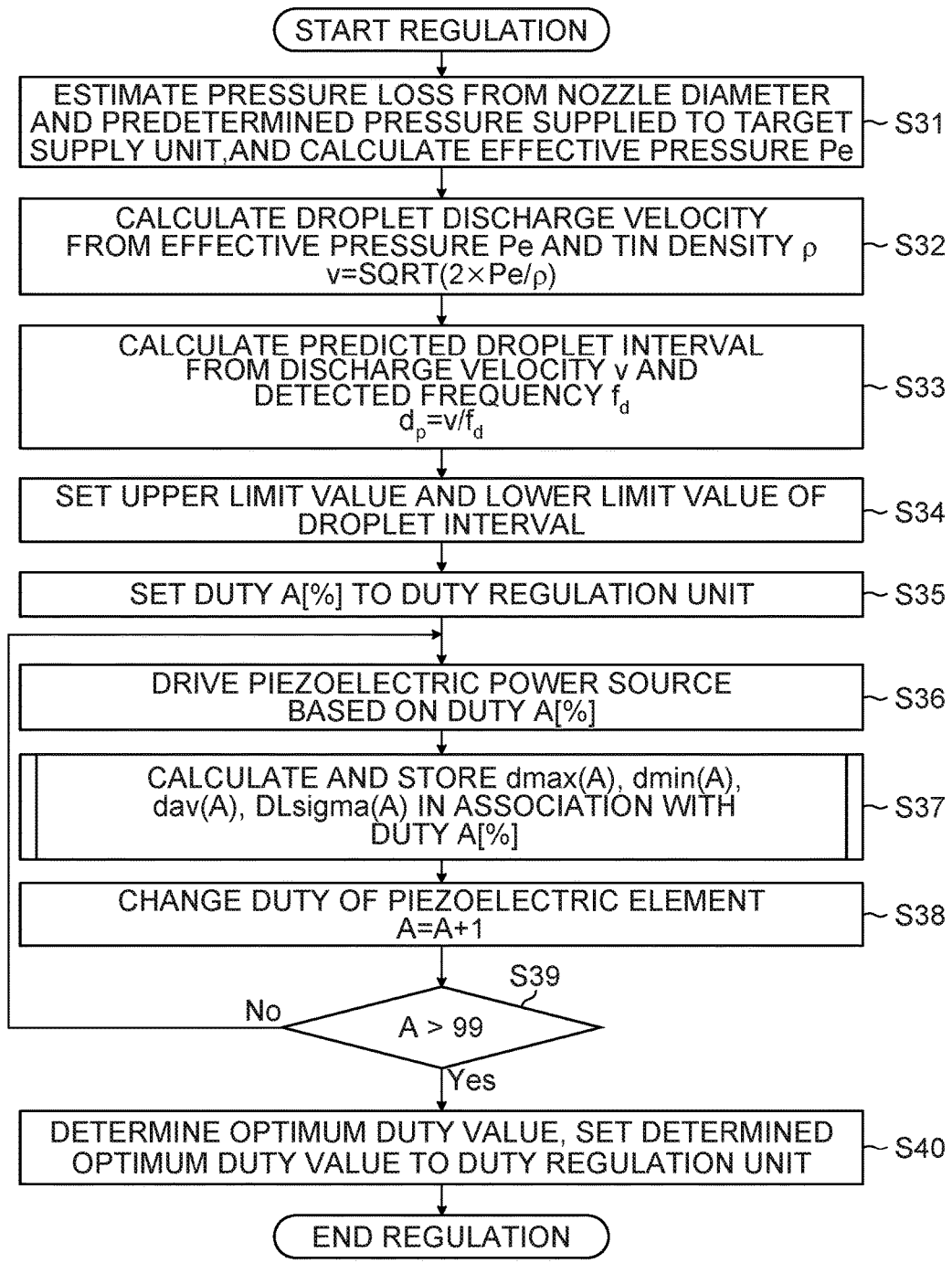
FIG. 18 is a flowchart illustrating contents of a process of duty regulation in the second embodiment.

FIG. 18 is a flowchart illustrating contents related to a process of duty regulation in the second embodiment. The flowchart of FIG. 18 may be adoptable instead of the flowchart of duty regulation of the first embodiment described in FIG. 14.

At step S31, the control unit 70 of the second embodiment may estimate, and a pressure loss from a nozzle diameter and predetermined pressure supplied to the target supply unit 18, and calculate effective pressure $P_e$. The predetermined pressure may be a set value as set pressure of the tank 82, or may be detected by a sensor, not illustrated, that detects the pressure inside the tank 82 of the target supply unit 18.

At step S32, the control unit 70 may calculate a discharge velocity v of a droplet, from the effective pressure $P_e$ and the tin density $\rho$. The discharge velocity v may be calculated with use of an expression $v=SQRT(2 \times P_e/\rho)$. "SQRT( )" represents a square root of ( ).

At step S33, the control unit 70 may calculate a predicted droplet interval $d_p$, from the discharge velocity v and a detected frequency $f_d$ detected by the droplet detection device 76. The predicted droplet interval $d_p$ may be calculated with use of an expression $d_p=v/f_d$. It should be noted that a piezoelectric drive frequency $f_p$ may be a value natural number times the detected frequency $f_d$. This means that as for a natural number "m", a relationship of $fp=m \times f_d$ is established. Regarding droplets output from the nozzle 80 with a piezoelectric drive frequency, "m" pieces thereof coalesce together during falling, and then the coalesced droplets may be detected by the droplet detection device 76. In that case, "m" may be set based on the EUV light generation frequency. The EUV light generation frequency may be one almost equal to the detected frequency $f_d$.

Accordingly, at step S33, the control unit 70 may calculate the predicted droplet interval $d_p$ from the discharge velocity v and the piezoelectric drive frequency $f_p$.

The predicted droplet interval $d_p$ may be calculated with use of an expression $d_p=m \times v/f_p$. The predicted droplet interval $d_p$ may correspond to a form of a "predicted inter-droplet distance".

At step S34, the control unit 70 may set an upper limit value and a lower limit value of a droplet interval. For example, the control unit 70 may set values of ±15% of the predicted droplet interval $d_p$, calculated at step S33, to be the upper limit value and the lower limit value of the droplet interval. This means that the control unit 70 may set a range of ±15% of the predicted droplet interval $d_p$ to be a proper range of the droplet interval.

The process of step S34 may correspond to a form of a "process of setting a proper range of an inter-droplet distance". A proper range of the droplet interval may be a range allowable as a proper inter-droplet distance between droplets.

It should be noted that the flowchart of FIG. 18 shows an example of calculating the predicted droplet interval $d_p$ at step S33 as a reference for setting the upper limit value and the lower limit value of the droplet interval, before step S34. However, the control unit 70 may set the upper limit value and the lower limit value of the droplet interval by means of an appropriate method at step S34, without performing the process of step S33.

At step S35, the control unit 70 may set a duty A % to the duty regulation unit 154. Here, "A" represents a variable parameter of a duty value. The control unit 70 may set A to 1% as an initial value, for example. As the initial value, any appropriate value may be set without limiting to 1 [%].

At step S36, the duty regulation unit 154 may drive the piezoelectric power source 96 based on the set duty A %. By driving the piezoelectric power source 96 based on the setting of the duty A[%], a droplet may be generated and a passage timing signal may be output from the droplet detection device 76.

The droplet interval measurement unit 152 may measure passage timing intervals T(1), T(2), ... T(N) of respective droplets when passage timing signals are input. N takes any natural number that can be set previously. N may be 3 or larger but 50 or smaller. As an example, N=5 may be established.

The control unit 70 may calculate droplet intervals DLspace(1), DLspace(2), DLspace(N), from the droplet discharge velocity v and respective passage timing intervals T(1), T(2), ... T(N). With respect to a natural number k from 1 to N, the droplet interval DLspace(k) can be calculated from an expression DLspace(k)=v×T(N).

Each of the droplet intervals DLspace(1), DLspace(2), ... DLspace(N) may correspond to a form of an "inter-droplet distance measurement value". The process of calculating the droplet intervals DLspace(1), DLspace(2), ... DLspace(N) by the control unit 70 may correspond to a form of a "process of calculating an inter-droplet distance measurement value representing an inter-droplet distance from a passage time interval measurement value".

At step S37, the control unit 70 may calculate a maximum droplet interval dmax, a minimum droplet interval dmin, a droplet interval average value day, and a droplet interval variation DLsigma, from the respective DLspace(1), DLspace(2), ... DLspace(N). DLsigma may be a 3σ value of a standard deviation.

The control unit 70 may associate the calculated dmax, dmin, day, and DLsigma with the duty A, and store them as dmax(A), dmin(A), dav(A), and DLsigma(A) respectively. The process according to step S37 will be described below with use of FIG. 19.

The control unit 70 may perform processes of steps S36 and S37 for each duty A by sequentially changing the setting of the duty A by 1% from 1% to A=99%, for example.

This means that, at step S38, the control unit 70 may change the duty A of the piezoelectric power source 96 that drives the piezoelectric element 88, to A+1. Through step S38, the value of A+1 is newly set as the duty A. After step S38, the control unit 70 may move to step S39.

At step S39, the control unit 70 may determine whether or not the duty A exceeds 99%. When determining that the duty A is 99% or lower at step S39, the control unit 70 may return to step S36. The processes from step S36 to step S39 may be repeated until the duty A exceeds 99%.

When determining that the duty A exceeds 99% at step S39, the control unit 70 may move to step S40.

At step S40, the control unit 70 may determine an optimum value of the duty based on the data stored in association with the duty A, and set the determined optimum value as an optimum duty value in the duty regulation unit 154.

The control unit 70 may extract a data group in which dmax(A), dmin(A), and dav(A) are in the proper range of droplet intervals, from the stored data, and determine the duty A having the minimum DLsigma(A) in the extracted data group to be an optimum value. The proper range of the droplet interval may be a range defined by the upper limit value and the lower limit value determined at step S34.

At step S40, when the optimum duty value is set, the control unit 70 may end the regulation process of FIG. 18, and return to the flowchart of FIG. 12.

Then, the duty regulation unit 154 may drive the piezoelectric power source 96 based on the set duty.

As described above, the control unit 70 may perform the process of step S37 for respective duty values while changing the duty value at step S38. Such a configuration may correspond to a form of a "process of storing an inter-droplet distance measurement value of droplets generated at each duty value and variation in the inter-droplet distance measurement values, in association with a duty value". Each of dmax(A) and dmin(A) stored at step S37 may correspond to a form of an "inter-droplet distance measurement value" stored in association with a duty value. The "optimum duty value" determined by the control unit 70 at step S40 may correspond to a form of an "operation duty value that is a duty value of an electric signal suitable for operation of an excitation element". The process of step S40 may correspond to a form of a "process of determining an operation duty value".

Figure 19:
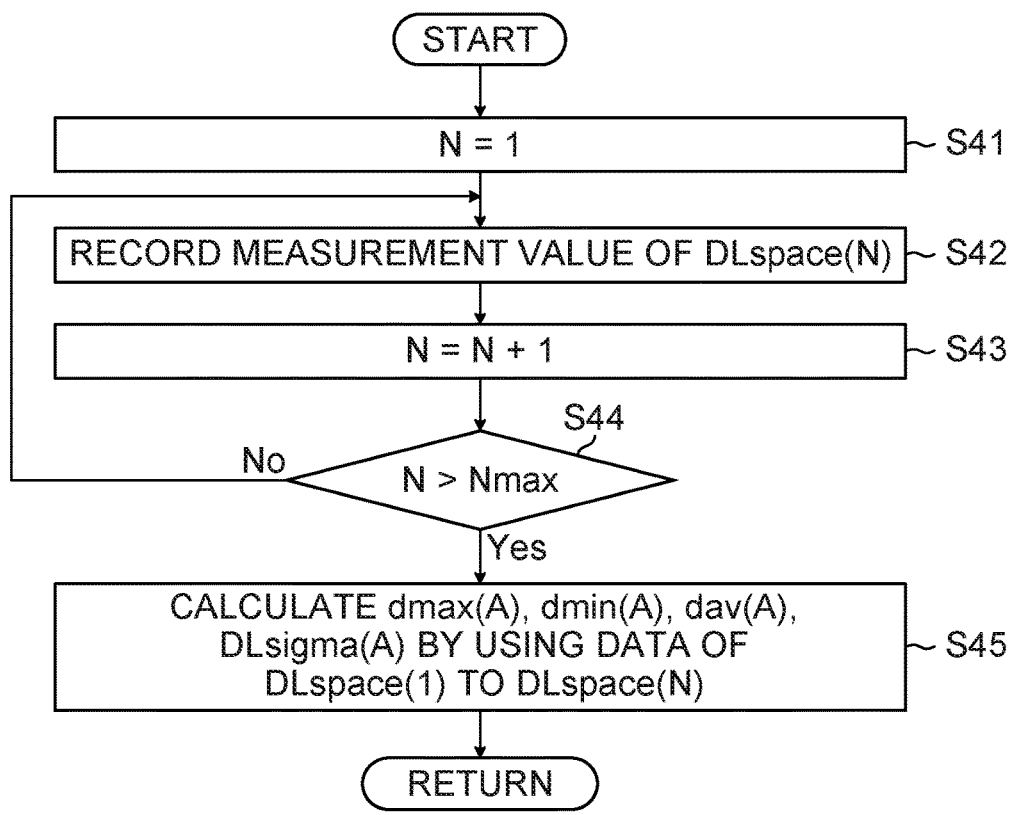
FIG. 19 is a flowchart illustrating a process performed at step S37 of FIG. 18.

FIG. 19 is a flowchart illustrating a process performed at step S37 of FIG. 18. At step S41 of FIG. 19, the control unit 70 may set a parameter N to 1 as an initial value.

At step S42, the control unit 70 may record a measurement value of the droplet interval DLspace(N).

At step S43, the control unit 70 may increment the value of N by 1 and newly set the value of N+1 as a value of the parameter N.

At step S44, the control unit 70 may determine whether or not the value of N exceeds Nmax that is a prescribed value previously set. Nmax may be set to any integer larger than the maximum number of measurement times of the passage timing intervals. For example, Nmax may be set to an appropriate value within a range from 4 to 51.

When determining that N≤Nmax at step S44, the control unit 70 may return to step S42.

On the other hand, when determining that N>Nmax at step S44, the control unit 70 may move to step S45.

At step S45, the control unit 70 may use data of DLspace (0) to DLspace(N) to calculate dmax(A), dmin(A), dav(A), and DLsigma(A). The control unit 70 may store the calculated dmax(A), dmin(A), dav(A), and DLsigma(A).

After step S45, the control unit 70 may return to the flowchart of FIG. 18.

As illustratively described in FIGS. 16A and 16B, the control unit 70 may change the duty by changing the ON time of the rectangular wave supplied from the duty regulation unit 154, and measure the droplet intervals DLspace (1) to DLspace(N) for respective duties. From the droplet intervals DLspace(1) to DLspace(N) measured for each duty, the control unit may calculate the variation DLsigma of the droplet intervals for such a duty.

For example, the control unit 70 may change the duty A from 1% to 99%, and for each duty value, measure the droplet intervals DLspace(1) to DLspace(N) and calculate the variation DLsigma of the droplet intervals. Then, the control unit 70 may set a duty value with which the measured DLspace(1) to DLSpace(N) are within a range between the upper limit value and the lower limit value of the proper range and DLsigma is the smallest, as an optimum duty value.

7.3 Effect

According to the second embodiment, even when a faulty coalesced droplet or a satellite is generated, it is possible to apply a duty value of a piezoelectric drive waveform with which such generation is detectable and proper droplet output can be made. Thereby, it is possible to suppress generation of a droplet of coalescence failure or a satellite, and to suppress a decrease in the EUV light energy and breakage of a laser device.

Figure 20:
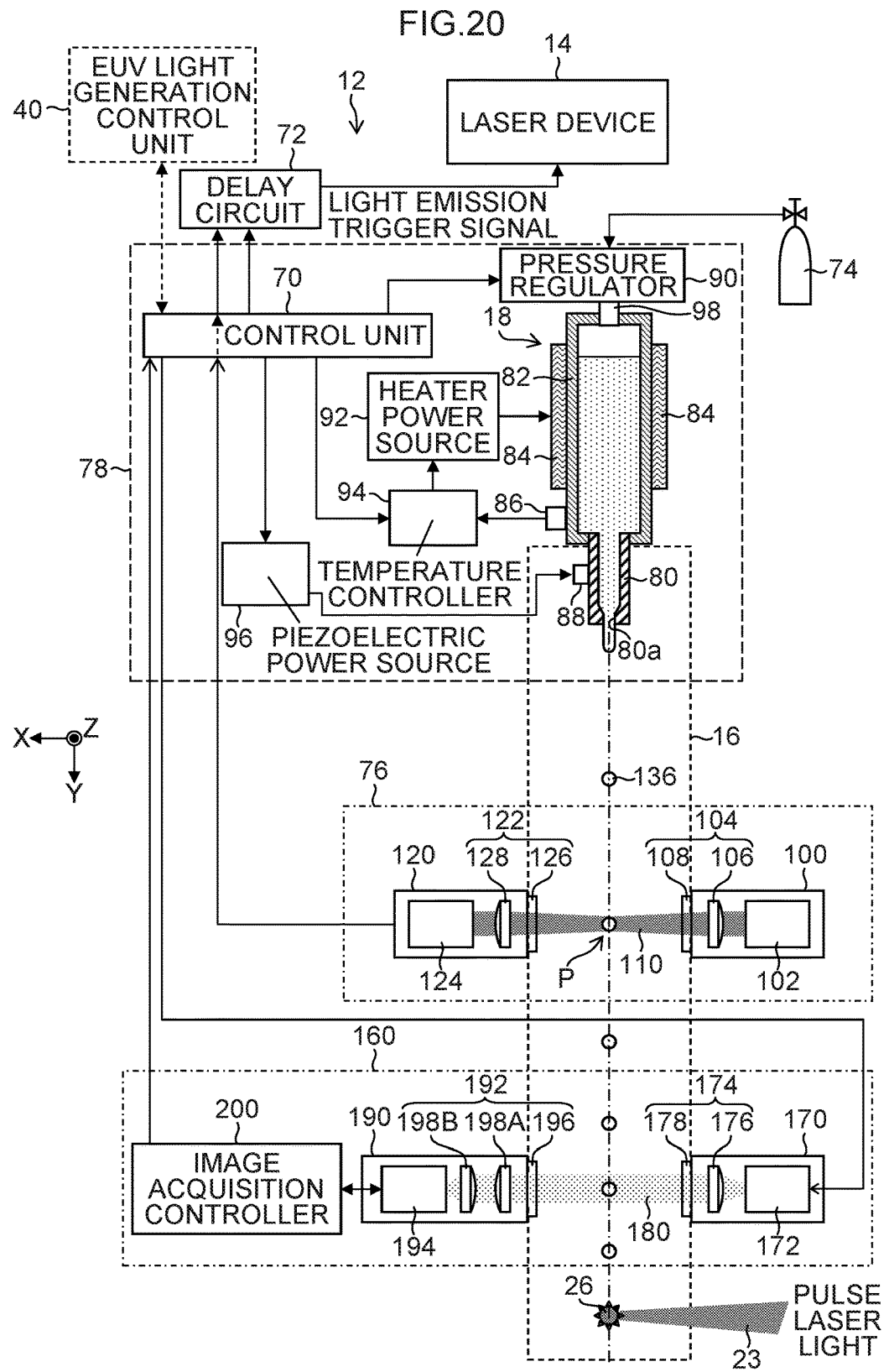
FIG. 20 schematically illustrates a configuration of an EUV light generating device including a target supply device of a third embodiment.
Figure 21:
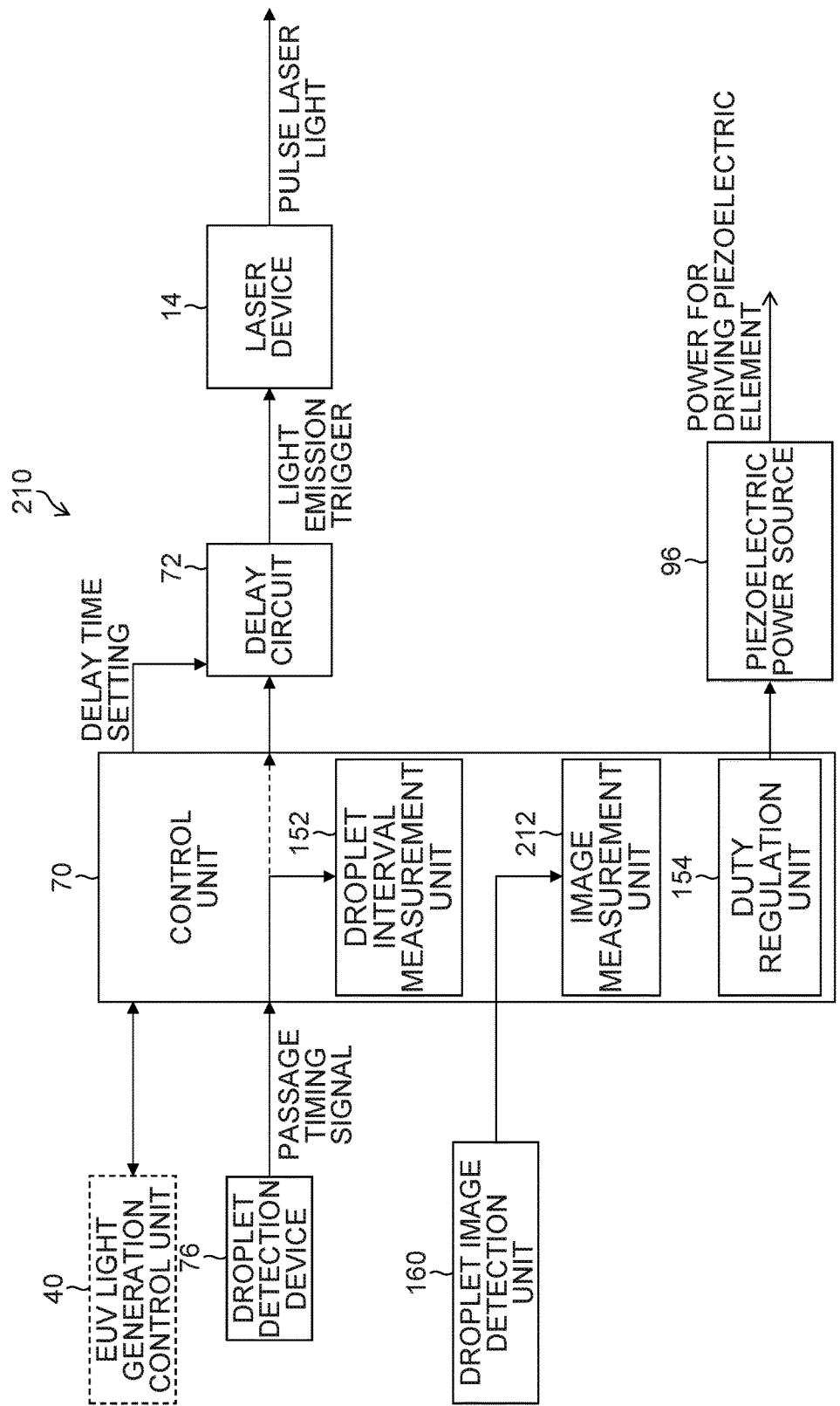
FIG. 21 is a block diagram illustrating a configuration of a control system according to the third embodiment.

8. Third Embodiment: Description of Target Supply Device According to Third Embodiment 8.1 Configuration FIGS. 20 and 21 illustrate a configuration of a third embodiment. Parts added to the first embodiment, in FIGS. 20 and 21, will be described below.

An EUV light generating device 12 of the third embodiment may include a droplet image detection unit 160. The target supply device 78 may include the droplet detection device 76 and the droplet image detection unit 160. The droplet image detection unit 160 may also include a light source unit 170 and a light receiving unit 190.

The light source unit 170 and the light receiving unit 190 may be disposed opposite to each other over a target travel path. The opposing direction of the light source unit 170 and the light receiving unit 190 may be orthogonal to the target travel path. In FIG. 20, the opposing direction of the light source unit 170 and the light receiving unit 190 is a direction (X axis direction) orthogonal to the Y direction. However, the description of FIG. 20 is not description for limiting the opposing direction of the light source unit 170 and the light receiving unit 190.

The light source unit 170 may include a light source 172 and an illumination optical system 174, and may be disposed to illuminate a droplet at a predetermined position on the trajectory between the nozzle 80 of the target supply unit 18 and the plasma generation region 26. The light source 172 may be a pulse-lighting light source such as a xenon flash lamp, a laser light source, or the like.

The light source 172 may be connected with the control unit 70. A "light source lighting signal" output from the control unit 70 may be input to the light source 172.

The light source lighting signal output from the control unit 70 may be a control signal for controlling operation of the light source 172 such that the light source 172 performs pulse lighting at predetermined timing. The light source 172 may emit pulse light based on the light source lighting signal given by the control unit 70.

The illumination optical system 174 may include a condensing lens 176 and a window 178. The illumination optical system 174 may be an optical system such as a collimator, and may be configured of an optical element such as a lens. The illumination optical system 174 may guide the pulse light output from the light source 172 to the droplet 136 on the target travel path.

The light receiving unit 190 may include a transfer optical system 192 and an image sensor 194, and may be disposed so as to receive illumination light 180 that is pulse light output from the light source unit 170. The image sensor 194 may be a two-dimensional image sensor such as a charge-coupled device (CCD).

The transfer optical system 192 may include a window 196 and a pair of lenses 198A and 198B. The lenses 198A and 198B each may be a convex lens or a concave lens. The transfer optical system 192 may image a shadow of the droplet 136, guided via the window 196, on the light receiving surface of the image sensor 194.

The image sensor 194 may capture an image of a shadow of the droplet 136 imaged by the transfer optical system 192. The image sensor 194 may include a shutter not illustrated. The shutter may be an electrical shutter or a mechanical shutter. The image sensor 194 may be configured to capture an image only when the shutter, not illustrated, is opened.

The droplet image detection unit 160 may also include an image acquisition controller 200. The image acquisition controller 200 may be connected with the image sensor 194. The image acquisition controller 200 may be connected with the control unit 70. The image sensor 194 may be connected with the control unit 70 via the image acquisition controller 200.

The image acquisition controller 200 may control an imaging operation by the image sensor 194 and an acquiring operation of an image signal from the image sensor 194, in accordance with an instruction by the control unit 70. The image acquisition controller 200 may have an image processing function of processing an image signal acquired from the image sensor 194 and generating image data of a data format suitable for transferring it to the control unit 70.

An "imaging timing signal" output from the image acquisition controller 200 may be input to the image sensor 194. The imaging timing signal may be a control signal for controlling the operation of the image sensor 194 such that the image sensor 194 captures an image of a shadow of the droplet 136 at predetermined timing.

The image sensor 194 may capture an image of a shadow of the droplet 136 based on the imaging timing signal of the control unit 70. Then, the image sensor 194 may generate image data according to the captured image of the shadow of the droplet 136.

The image sensor 194 may output the generated image data to the image acquisition controller 200. The image acquisition controller 200 may output the image data captured by the image sensor 194 to the control unit 70. The image data output from the droplet image detection unit 160 is called an "output image". The control unit 70 may measure the state of the droplet 136 from the image output from the droplet image detection unit 160.

FIG. 21 is a block diagram of a control system 210 according to the third embodiment. As illustrated in FIG. 21, the control unit 70 may include an image measurement unit 212. The droplet image detection unit 160 may be connected with the image measurement unit 212 of the control unit 70.

The image measurement unit 212 may be a circuit that detects presence or absence of a faulty coalesced droplet or a satellite, based on an output image from the droplet image detection unit 160. Alternatively, it may be a program stored in the control unit 70 and executable by the control unit 70.

8.2 Operation

Figure 22A:
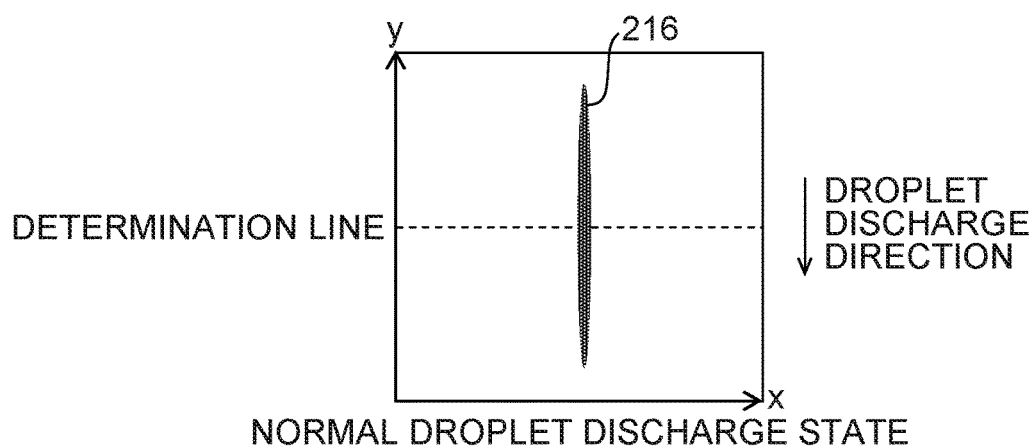
FIG. 22A illustrates an example of an output image in which a normal droplet discharging state is captured.

The image measurement unit 212 may acquire an output image from the droplet image detection unit 160. FIG. 22A illustrates an example of an output image in which a normal droplet discharge state is captured. The horizontal axis in FIG. 22A represents a pixel position in a horizontal direction of the output image. The x axis, that is a horizontal axis in FIG. 22A, corresponds to the coordinate axis showing the position in a direction parallel to the Z axis defined in FIG. 2. The vertical axis in FIG. 22A represents a pixel position in a vertical direction of the output image. The y axis, that is a vertical axis in FIG. 22A, corresponds to the coordinate axis showing the position in a direction parallel to the Y axis defined in FIG. 2. The output image from the droplet image detection unit 160 may be a two-dimensional image of a plane parallel to the ZY plane. The droplet discharge direction is a direction from up to down in FIG. 22A.

A linear shadow 216 extending vertically illustrated in a center portion of the output image illustrated in FIG. 22A is generated by passage of a droplet. The image measurement unit 212 may generate a cross-section profile on a determination line of the output image. The determination line may be a line parallel to the x axis direction in the output image. The determination line may be set on an appropriate y coordinate crossing the linear shadow 216. For example, the determination line may be set in a center portion of the image range in the y direction in the output image.

Figure 22B:
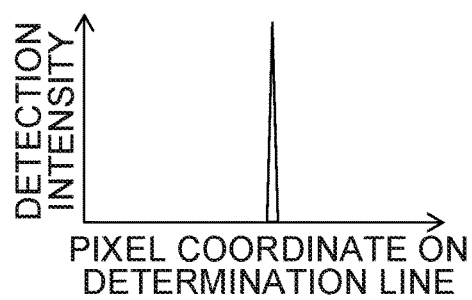
FIG. 22B illustrates an example of a cross-section profile on a determination line of the output image illustrated in FIG. 22A.

FIG. 22B illustrates an example of a cross-section profile on the determination line of the output image illustrated in FIG. 22A. The horizontal axis of FIG. 22B represents a pixel coordinate on the determination line, namely a pixel position in the Z direction. The vertical axis of FIG. 22B represents a detected intensity of the droplet in the output image.

Figure 23A:
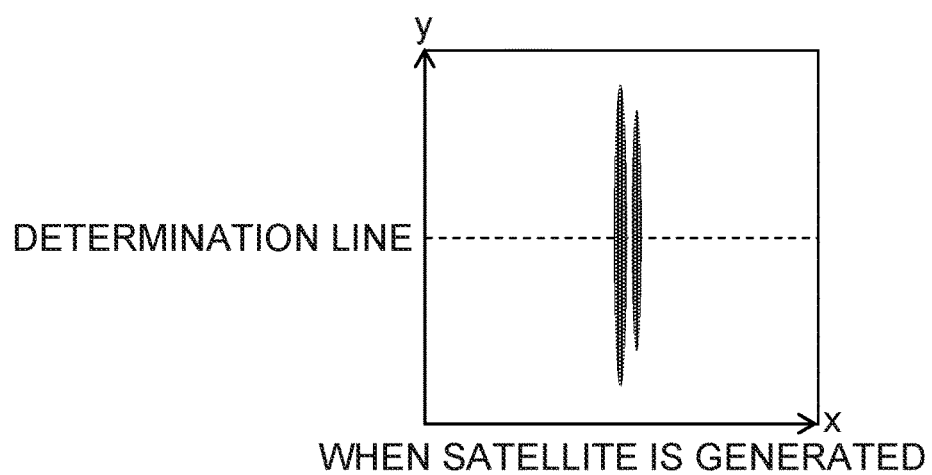
FIG. 23A illustrates an example of an output image in which a state where a satellite is generated is captured.
Figure 23B:
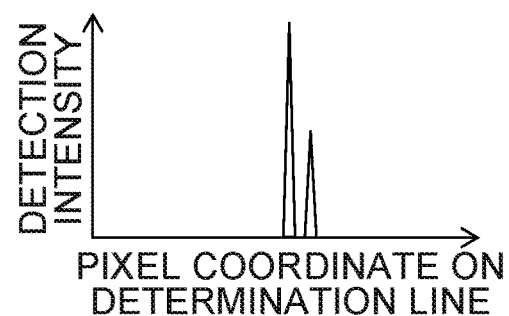
FIG. 23B illustrates an example of a cross-section profile on a determination line of the output image illustrated in FIG. 23A.

FIG. 23A illustrates an example of an output image in which a state where a satellite is generated is captured. The horizontal axis and the vertical axis of FIG. 23A are defined similarly to the horizontal axis and the vertical axis of FIG. 22A. FIG. 23B illustrates an example of a cross-section profile on the determination line of the output image illustrated in FIG. 23A. The horizontal axis and the vertical axis of FIG. 23B are defined similarly to the horizontal axis and the vertical axis of FIG. 22B. As illustrated in FIG. 23B, when a satellite is generated, a plurality of peaks may be detected in the cross-section profile.

The image measurement unit 212 may determine whether or not the cross-section profile has only a single peak, and output the result to the control unit 70. In the case where the cross-section profile has a plurality of peaks, the control unit 70 may determine that a satellite is generated and perform duty regulation of a drive signal of the piezoelectric element 88. The other operation may be the same as that of the first embodiment and the second embodiment.

Figure 24:
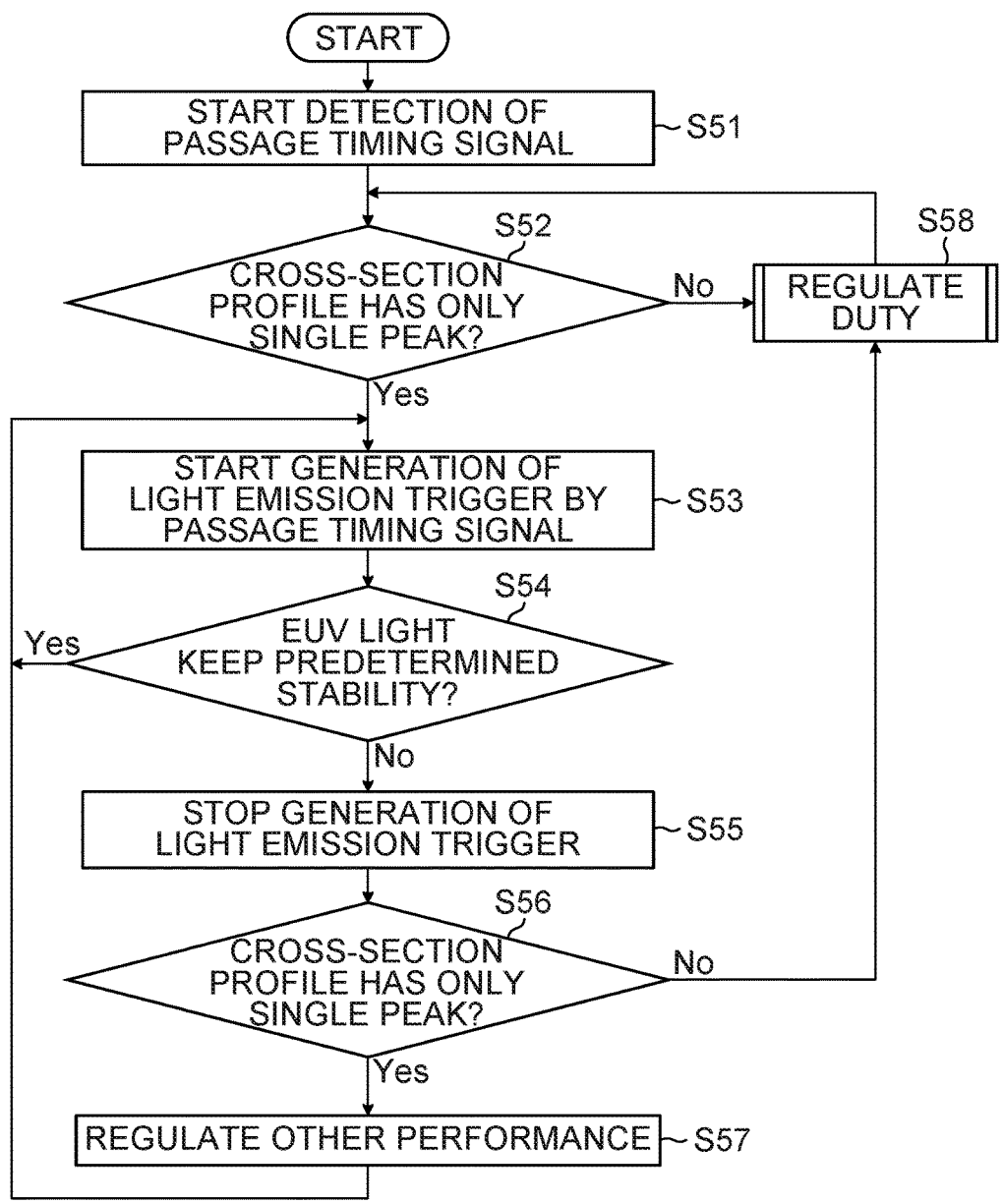
FIG. 24 is a flowchart illustrating an exemplary operation of a control unit in the third embodiment.

FIG. 24 is a flowchart illustrating an exemplary operation of the control unit 70 in the third embodiment. The flowchart illustrated in FIG. 24 may adopt steps S52 and S56, instead of steps S2 and S6 in the flowchart of the first embodiment described in FIG. 12. Steps S51, S53 to S55, S57, and S58 of the flowchart illustrated in FIG. 24 may be the same as steps S1, S3 to S5, S7, and S8 of the flowchart illustrated in FIG. 12, respectively.

When a start signal is input from the EUV light generation control unit 40 to the target supply device 78, the control unit 70 may start processes illustrated in the flowchart of FIG. 24. At step S51, the control unit 70 may start detection of a passage timing signal. Further, the droplet measurement unit 212 of the control unit 70 may start acquisition of an output image from the droplet image detection unit 160.

At step S52, the image measurement unit 212 may determine whether or not a cross-section profile on the determination line of the acquired output image has only a single peak. In the determination process of step S52, when the image measurement unit 212 determines that the cross-section profile has a single peak, the image measurement unit 212 may move to step S53. On the other hand, at step S52, when the image measurement unit 212 detects a plurality of peaks, the image measurement unit 212 may move to step S58.

At step S53, the control unit 70 may start generation of a light emission trigger by a passage timing signal. When generation of a light emission trigger is started, the delay circuit 72 may generate a light emission trigger by giving a delay of a predetermined delay time $t_d$ to a passage timing signal.

At step S54, the control unit 70 may determine whether or not the EUV light generated by the EUV light generating device keeps predetermined stability. The control unit 70 may perform determination of step S54 based on a signal obtained from the EUV light generation control unit 40.

At step S54, when the control unit 70 determines that the EUV light generated by the EUV light generating device keeps predetermined stability, the control unit 70 may return to step S53. On the other hand, when the control unit 70 determines, at step S54, that EUV light does not keep predetermined stability due to input of a light emission trigger stop signal from the EUV light generation control unit 40 to the control unit 70, for example, the control unit 70 may move to step S55.

At step S55, the control unit 70 may stop generation of a light emission trigger. When generation of a light emission trigger is stopped, output of pulse laser light from the laser device 14 is stopped, and generation of EUV light is stopped.

In the case of resuming generation of EUV light, the control unit 70 checks the cross-section profile at step S56, and when the cross-section profile has a plurality of peaks, the control unit 70 may perform duty regulation of step S58. In the duty regulation of step S58, duty regulation described in FIG. 14 of the first embodiment may be performed. Alternatively, in the duty regulation of step S58, duty regulation described in FIG. 18 of the second embodiment may be performed.

Meanwhile, at step S56, the control unit 70 determines that the cross-section profile has a single peak, the control unit 70 may move to step S57.

At step S57, the control unit 70 may perform performance regulation other than duty regulation of step S58. After step S57, the control unit 70 may return to step S53 and resume generation of a light emission trigger. The flowchart of FIG. 24 can be ended at any timing by an interruption process from the EUV light generation control unit 40.

9. Fourth Embodiment: Description of Target Supply Device According to Fourth Embodiment

9.1 Configuration

A target supply device according to a fourth embodiment is a variation of the optical sensor 124 of the light receiving unit 120 in the droplet detection device 76 described in the first embodiment and the second embodiment. Hereinafter, a difference from the first embodiment and the second embodiment will be described. An optical sensor 124 of a light receiving unit 120 of the fourth embodiment may be configured to include a plurality of light receiving surfaces.

Figure 25:
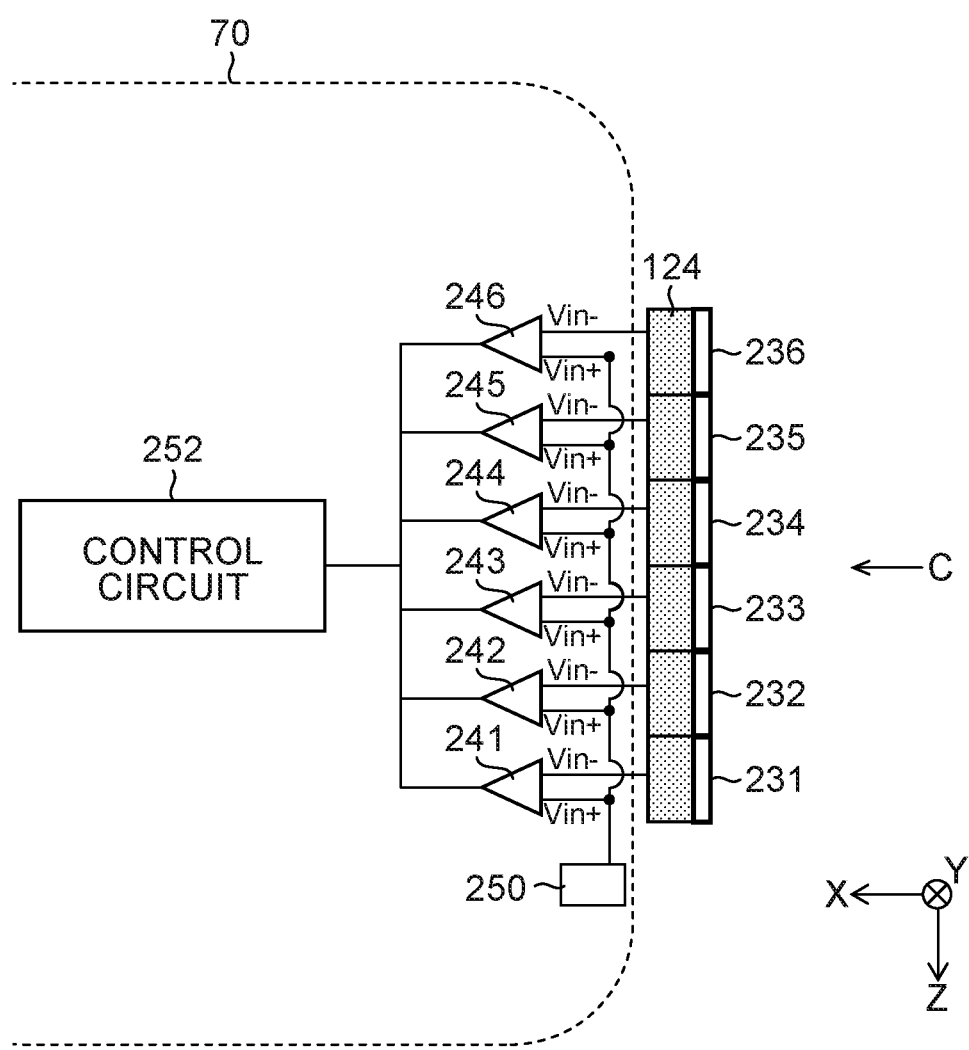
FIG. 25 illustrates an exemplary configuration of an optical sensor adoptable as a light receiving unit of a droplet detection device of a fourth embodiment.

FIG. 25 illustrates an exemplary configuration of the optical sensor 124 adoptable in the light receiving unit 120 of the fourth embodiment. For example, as illustrated in FIG. 25, the optical sensor 124 may have six light receiving surfaces 231 to 236. Alternatively, the optical sensor 124 may be configured of a plurality of adjacent optical sensors. The optical sensor 124 may be a diode array, an avalanche photodiode array (APD array), or a PIN photodiode. Alternatively, the optical sensor 124 may be configured of a plurality of photodiodes or a plurality of avalanche photodiodes.

Figure 26:
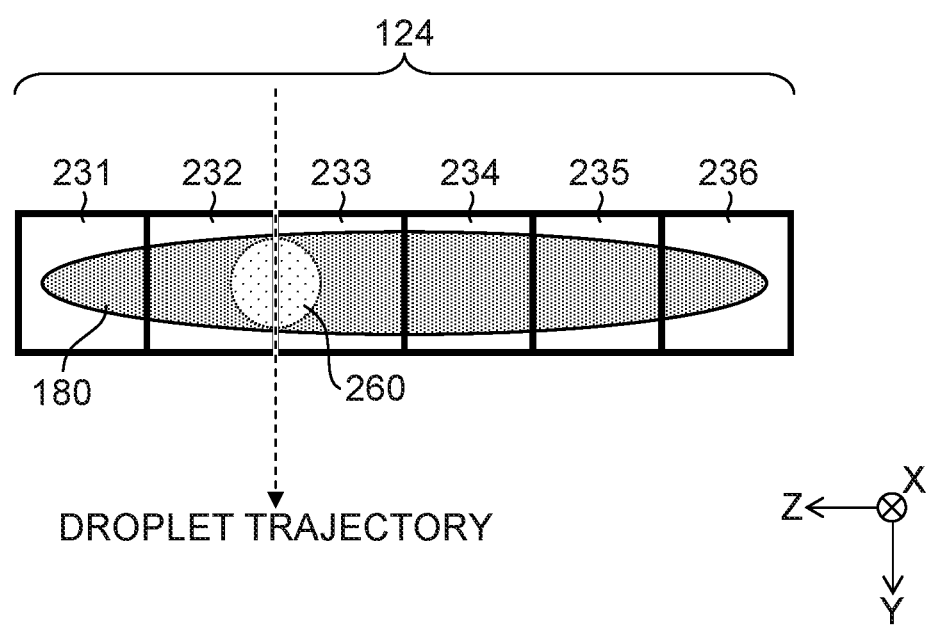
FIG. 26 illustrates an optical sensor capturing a normal droplet discharging state, seen from the light receiving surface side.
Figure 27:
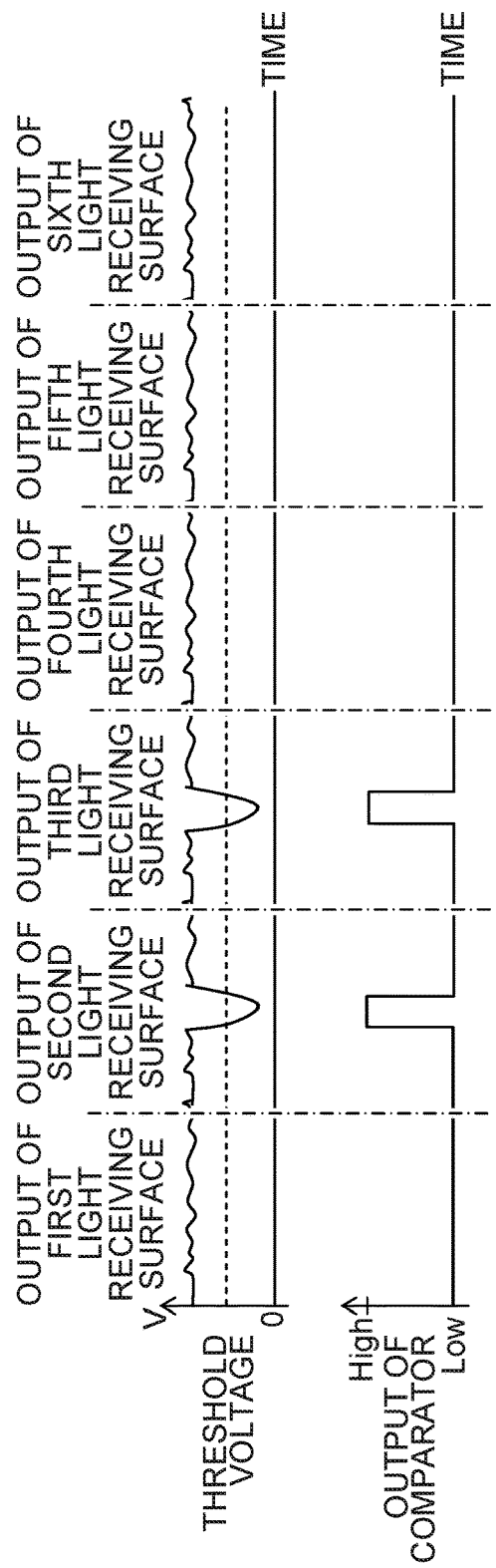
FIG. 27 illustrates examples of output voltage and threshold voltage of respective light receiving surfaces of an optical sensor, and examples of outputs of respective comparators.

It is desirable that an image of the illumination light 180 emitted from the light source unit 170 may be formed across the entire light receiving surfaces 231 to 236 (see FIGS. 26 and 27).

The control unit 70 may have comparators 241 to 246 to which passage timing signals output respectively from the light receiving surfaces 231 to 236 are input respectively. Each passage timing signal output from each of the light receiving surfaces 231 to 236 may be input to a Vin− terminal, for example, of each of the comparators 241 to 246.

The control unit 70 may have a threshold voltage generator 250. The threshold voltage generator 250 may be connected with a Vin+ terminal of each of the comparators 241 to 246.

The control unit 70 may have a control circuit 252, and an input terminal of the control circuit 252 may be connected with an output terminal of each of the comparators 241 to 246.

9.2 Operation

FIG. 26 illustrates the optical sensor 124 capturing a normal droplet discharging state, seen from the light receiving surface side. FIG. 26 corresponds to a C arrow view of the optical sensor 124 illustrated in FIG. 25, seen from the direction of an arrow C. As illustrated in FIG. 26, an image of the irradiation region of the illumination light 180 may be formed across the six light receiving surfaces 231 to 236 of the optical sensor 124. When a droplet passes through the irradiation region of the illumination light 180, a shadow 260 of the droplet may be generated on any of the light receiving surfaces 231 to 236. For example, the shadow 260 of the droplet may be generated on the second light receiving surface 232 and the third light receiving surface 233 from the left, as illustrated in FIG. 26.

FIG. 27 illustrates examples of output voltage and threshold voltage of the respective light receiving surfaces 231 to 236 of the optical sensor 124 and examples of outputs of the respective comparators 241 to 246. In FIG. 27, a range sectioned by an alternate long and short dash line in the vertical direction corresponds to an output of each of the light receiving surfaces 231 to 236. In FIG. 27, the respective light receiving surfaces 231 to 236 are described as a first light receiving surface to a sixth light receiving surface, respectively. The horizontal axis in FIG. 27 represents the time, and for each range corresponding to an output of each light receiving surface, the same light receiving time range is shown. The light receiving time range of the respective light receiving surfaces 231 to 236 illustrated in FIG. 27 may be an inverse number of a detected frequency $f_d$ of a droplet.

In the case of the state illustratively shown in FIG. 26, outputs from the light receiving surface 232 that is the second light receiving surface and from the light receiving surface 233 that is the third light receiving surface of the optical sensor 124 may generate signals corresponding to a change in the light quantity by the shadow 260 of the droplet, as illustrated in FIG. 27. Meanwhile, on the other light receiving surfaces 231 and 234 to 236, no shadow is generated. Respective outputs from the light receiving surface 231 that is the first light receiving surface and from the light receiving surfaces 234 to 236 that are the fourth to sixth light receiving surfaces may have a noise level in a state of receiving the illumination light 180, like an output of the light receiving surface 236 that is the sixth light receiving surface, for example.

Outputs from the light receiving surface 232 and from the light receiving surface 233 of the optical sensor 124 are compared with the threshold voltage in the comparator 242 and the comparator 243. During a period in which Vin+>Vin− is satisfied, outputs of the comparators 242 and 243 are in a high level. On the other hand, outputs of the other comparators 241 and 244 to 246 may be in a low level. It is preferable to previously determine the threshold voltage through experiments or the like such that a drop in the light quantity by the shadow 260 of a droplet can be detected and noise is not detected, and to set the threshold voltage in the threshold voltage generator 250.

9.3 Effect

By adopting a configuration in which the optical sensor 124 includes a plurality of light receiving surfaces 231 to 236 and respective output levels are measured, it is possible to detect generation of a satellite as described below.

Figure 28:
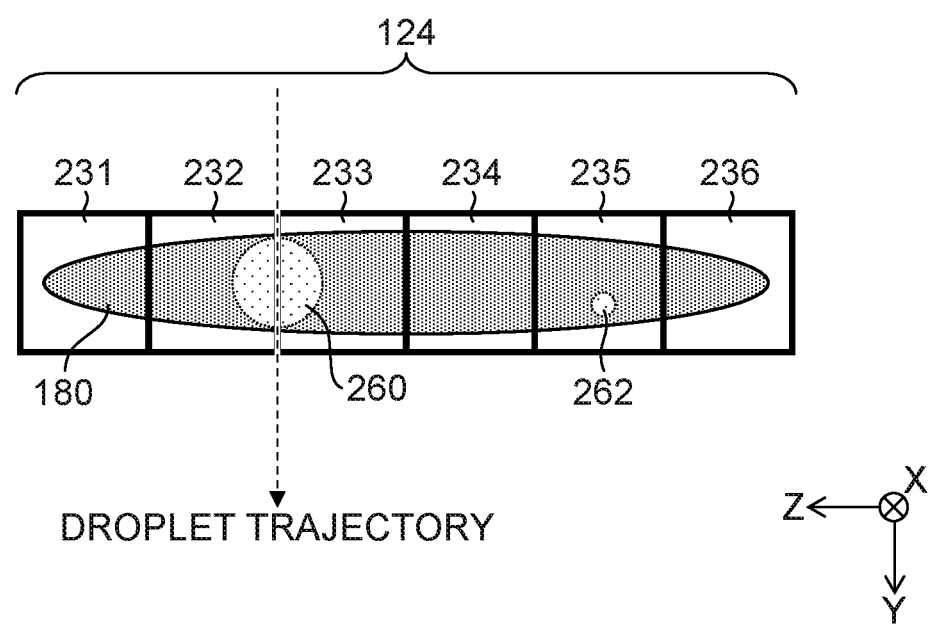
FIG. 28 illustrates an optical sensor capturing a droplet discharging state when a satellite is generated, seen from the light receiving surface side.

FIG. 28 illustrates the optical sensor 124 capturing a droplet discharging state when a satellite is generated, seen from the light receiving surface side. As illustrated in FIG. 28, when a droplet and a satellite pass through the irradiation region of the illumination light 180, the shadow 260 of the droplet and a shadow 262 of the satellite may be generated on any of the light receiving surfaces 231 to 236. For example, as illustrated in FIG. 28, the shadow 260 of the droplet may be generated on the light receiving surfaces 232 and 233, and the shadow 262 of the satellite may be generated on the light receiving surface 235.

Figure 29:
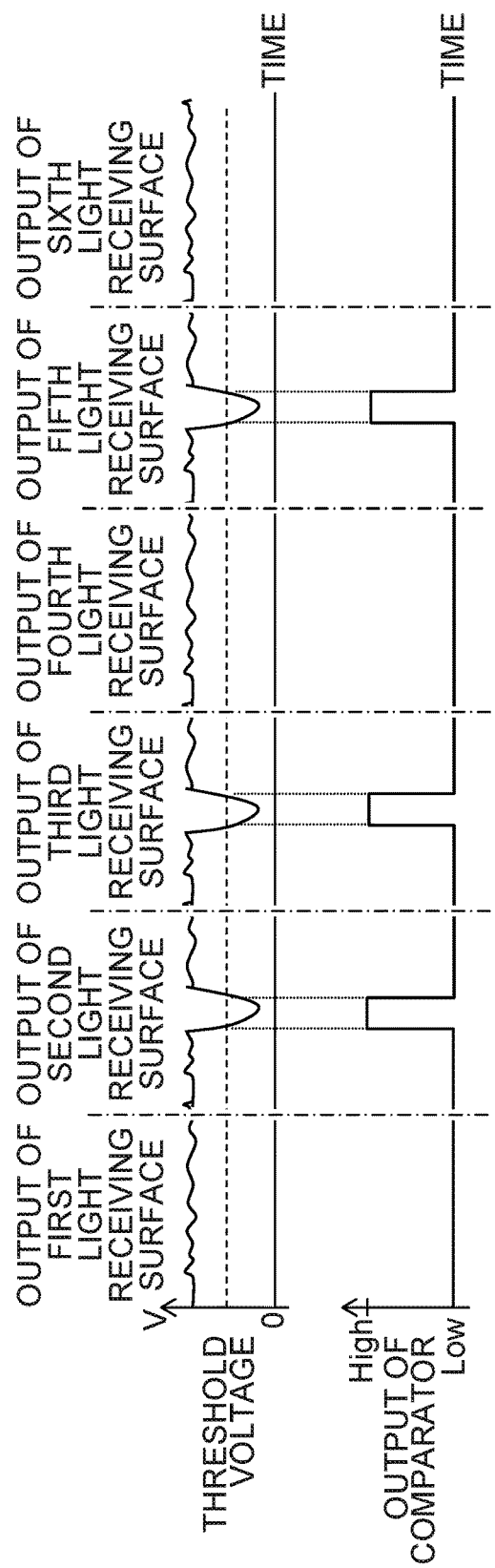
FIG. 29 illustrates examples of output voltage and threshold voltage of respective light receiving surfaces of an optical sensor in a droplet discharging state when a satellite is generated, and examples of outputs of respective comparators.

FIG. 29 illustrates examples of output voltage and threshold voltage of the respective light receiving surfaces 231 to 236 of the optical sensor 124 in a droplet discharging state when a satellite is generated, and examples of outputs of the respective comparators 241 to 246. In the case of the state illustratively shown in FIG. 28, outputs from the light receiving surfaces 232, 233, and 235 of the optical sensor 124 may generate signals corresponding to a change in the light quantity by the shadow 260 of the droplet and the shadow 262 of the satellite, as illustrated in FIG. 29. On the other hand, on the other light receiving surfaces 231, 234, and 236, outputs from the respective light receiving surfaces 231, 234, and 236 may have a noise level in a state of receiving the illumination light 180, like an output of the light receiving surface 236.

The droplet discharging state when a satellite is generated, including the state illustratively shown in FIGS. 28 and 29, is detectable by the control circuit 252 when it corresponds to any of the states [1] to [3] described below.

[1] An output level of one comparator and an output level of another comparator not adjacent thereto are high level.

[2] Output levels of two adjacent comparators and one comparator not adjacent to the two comparators are high level (see FIG. 29).

[3] Output levels of three adjacent comparators are high level.

Further, a normal droplet discharging state is detectable by the control circuit 252 when it corresponds to any of the states [4] and [5] described below.

[4] Only one output level of the comparators is high level.

[5] Output levels of two adjacent comparators are high level (see FIG. 27).

Figure 30:
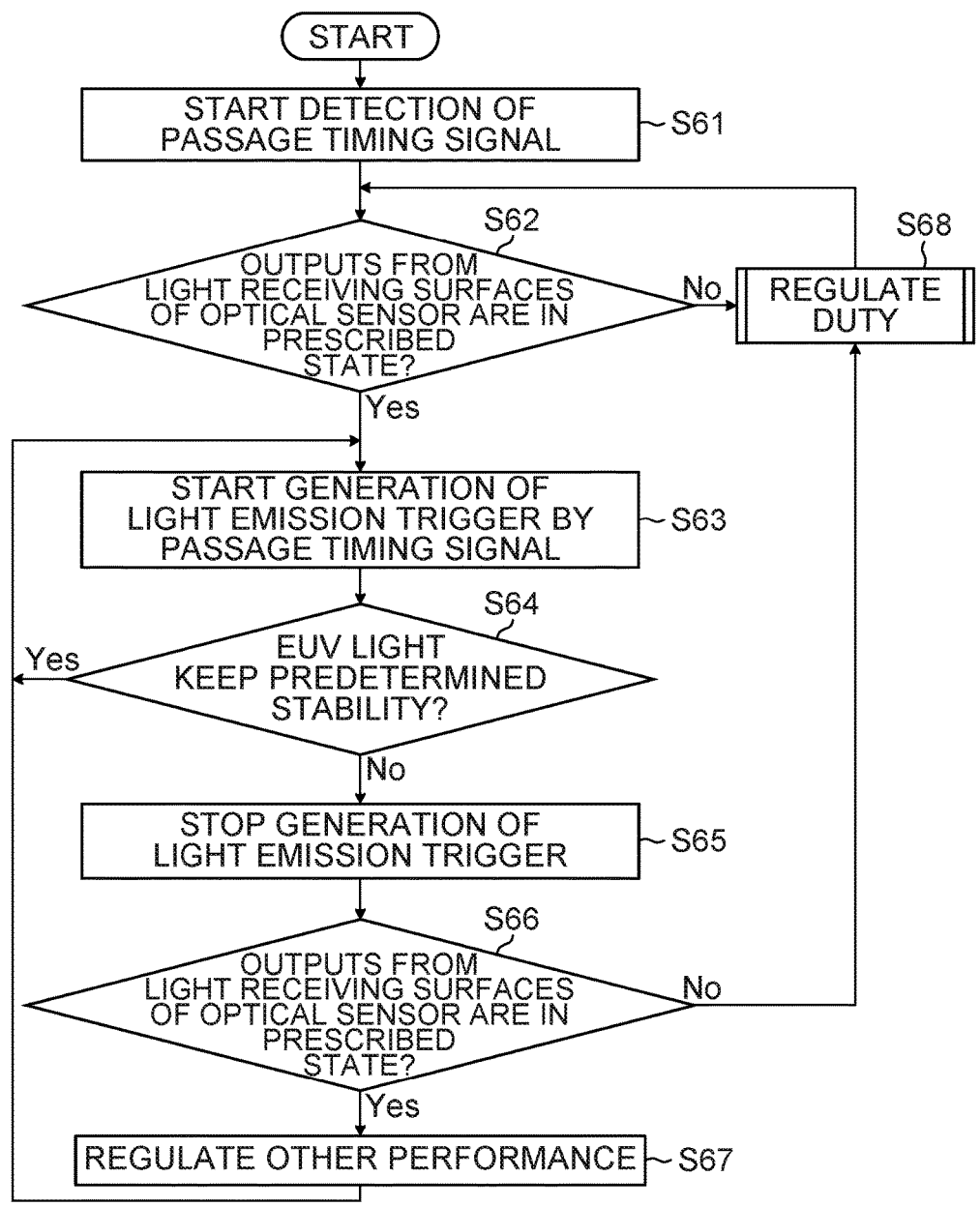
FIG. 30 is a flowchart illustrating an operation of a control unit in the fourth embodiment.

FIG. 30 is a flowchart illustrating an operation of the control unit 70 in the fourth embodiment. In the flowchart illustrated in FIG. 30, steps S62 and S66 may be adopted instead of steps S2 and S6 in the flowchart of the first embodiment described in FIG. 12. Steps S61, S63 to S65, S67, and S68 of the flowchart illustrated in FIG. 30 may be processes similar to those of steps S1, S3 to S5, S7, and S8 of the flowchart illustrated in FIG. 12, respectively.

When a start signal is input from the EUV light generation control unit 40 to the target supply device 78, the control unit 70 may start a process shown in the flowchart of FIG. 30. At step S61, the control unit 70 may start detection of a passage timing signal.

At step S62, the control unit 70 may determine whether or not outputs from the respective light receiving surfaces 231 to 236 of the optical sensor 124 are in a prescribed state. The "prescribed state" serving as a criterion of step S62 may be a state where normal droplet discharge is detected. For example, it may be set as a state where either condition of the aforementioned state [4] or [5] is satisfied.

At step S62, when the control unit 70 determines that output values from the respective light receiving surfaces of the optical sensor 124 are in the prescribed range, the control unit 70 may move to step S63. On the other hand, at step S62, when the control unit 70 detects that outputs from the respective light receiving surfaces 231 to 236 of the optical sensor 124 are not in a prescribed state, the control unit 70 may move to step S68. For example, when none of the aforementioned states [4] and [5] is satisfied, or when any of the aforementioned states [1] to [3] is satisfied, the control unit 70 may move to step S68. In the duty regulation of step S68, the same process as that of the duty regulation described in the flowchart of FIG. 14 may be performed. Further, in the duty regulation of step S68, the same process as that of the duty regulation described in the flowchart of FIG. 18 may be performed.

At step S63, the control unit 70 may start generation of a light emission trigger by a passage timing signal. When generation of a light emission trigger is started, the delay circuit 72 may generate a light emission trigger by giving a delay of a predetermined delay time $t_d$ to a passage timing signal.

At step S64, the control unit 70 may determine whether or not the EUV light generated by the EUV light generating device keeps predetermined stability. The control unit 70 may perform determination of step S64 based on a signal obtained from the EUV light generation control unit 40.

At step S64, when the control unit 70 determines that the EUV light generated by the EUV light generating device keeps predetermined stability, the control unit 70 may return to step S63. On the other hand, when the control unit 70 determines, at step S64, that EUV light does not keep predetermined stability due to input of a light emission trigger stop signal from the EUV light generation control unit 40 to the control unit 70, for example, the control unit 70 may move to step S65.

At step S65, the control unit 70 may stop generation of a light emission trigger. When generation of a light emission trigger is stopped, output of pulse laser light from the laser device 14 is stopped, and generation of EUV light is stopped.

In the case of resuming generation of EUV light, at step S66, the control unit 70 may check whether or not outputs of the respective light receiving surfaces of the optical sensor 124 satisfy the prescribed state, and then when outputs of the respective light receiving surfaces do not satisfy the prescribed state, the control unit 70 may perform duty regulation of step S68.

On the other hand, when the control unit 70 determines that outputs of the respective light receiving surfaces of the optical sensor 124 satisfy the prescribed state at step S66, the control unit 70 may move to step S67.

At step S67, the control unit 70 may perform performance regulation other than the duty regulation of step S68. After step S67, the control unit 70 may return to step S63 and resume generation of a light emission trigger.

The flowchart of FIG. 30 can be ended at any timing by an interruption process from the EUV light generation control unit 40.

10. Fifth Embodiment: Description of Target Supply Device According to Fifth Embodiment

10.1 Configuration

Figure 31:
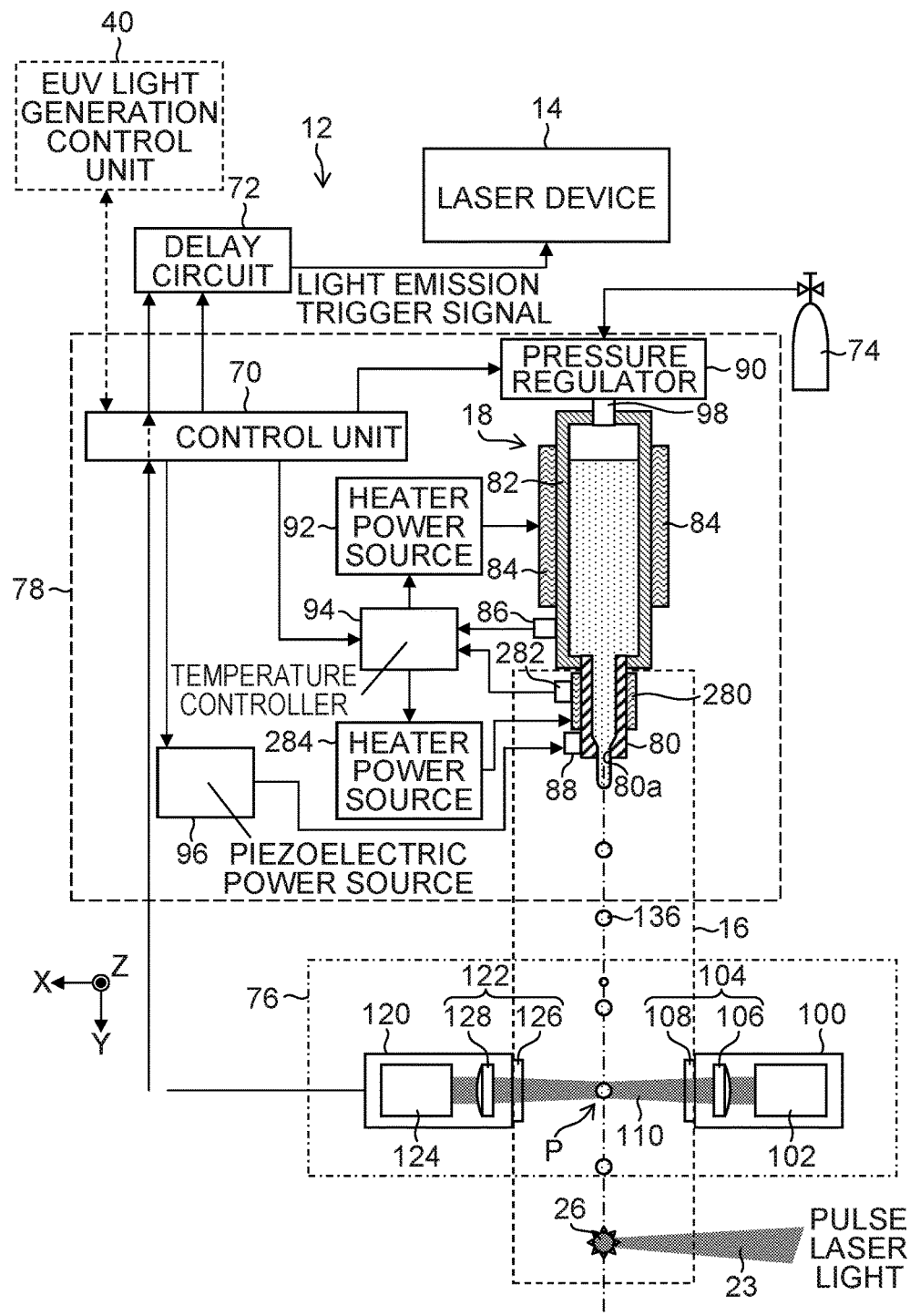
FIG. 31 schematically illustrates a configuration of an EUV light generating device including a target supply device of a fifth embodiment.

FIG. 31 illustrates a configuration of a fifth embodiment. Parts changed from the first embodiment or the second embodiment, in FIG. 31, will be described below.

As illustrated in FIG. 31, a heater 280 may be assembled to an outside portion of the nozzle 80, and a nozzle temperature sensor 282 may be assembled to the heater 280. The heater 280 may be connected with a heater power source 284. The nozzle temperature sensor 282 and the heater power source 284 may be connected with the temperature controller 94.

10.2 Operation

The temperature controller 94 may control the temperature of the nozzle 80 within a range of ±0.1° C. of the prescribed temperature, for example, based on the temperature information obtained from the nozzle temperature sensor 282. Further, the nozzle 80 may be connected with a cooling pipe and a chiller not illustrated, and the temperature controller 94 may control the temperature of the cooling water in the chiller within a predetermined temperature range.

10.3 Effect

By controlling the temperature of the nozzle 80 with high accuracy, the droplet generation interval can be further stabilized. Thereby, as the variation Tsigma(A) of the passage timing intervals and the variation DLsigma(A) of the droplet intervals are decreased, it is possible to select an optimum duty value of higher accuracy. Further, the highly accurate temperature control of the nozzle 80 also contributes to suppression of generation of a satellite. The configuration of controlling the temperature of the nozzle 80 described in the fifth embodiment is applicable in combination with the third embodiment or the fourth embodiment.

11. Sixth Embodiment: Description of Target Supply Device According to Sixth Embodiment

11.1 Configuration

Figure 32:
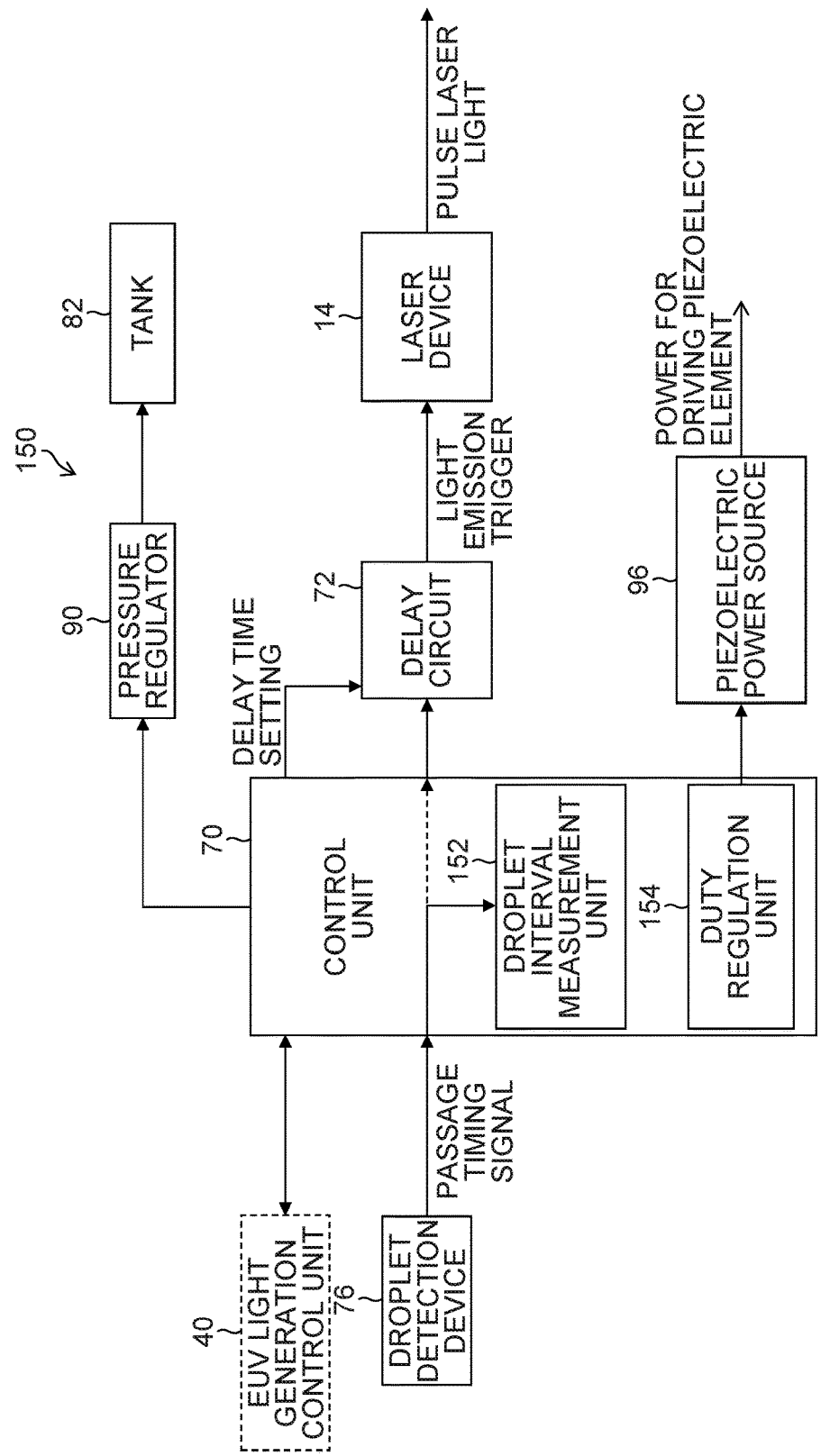
FIG. 32 is a block diagram illustrating a configuration of a control system of a target supply device according to a sixth embodiment.

FIG. 32 is a block diagram illustrating a configuration of a control system in a target supply device according to a sixth embodiment. The configuration illustrated in FIG. 32 is adoptable instead of the configuration described in FIG. 10. As illustrated in FIG. 32, the control unit 70 may be configured to transmit a signal for resetting the target pressure set to the pressure regulator 90. The pressure regulator 90 may regulate the pressure of the tank 82 in accordance with the target pressure set by the control unit 70.

11.2 Operation

Figure 33:
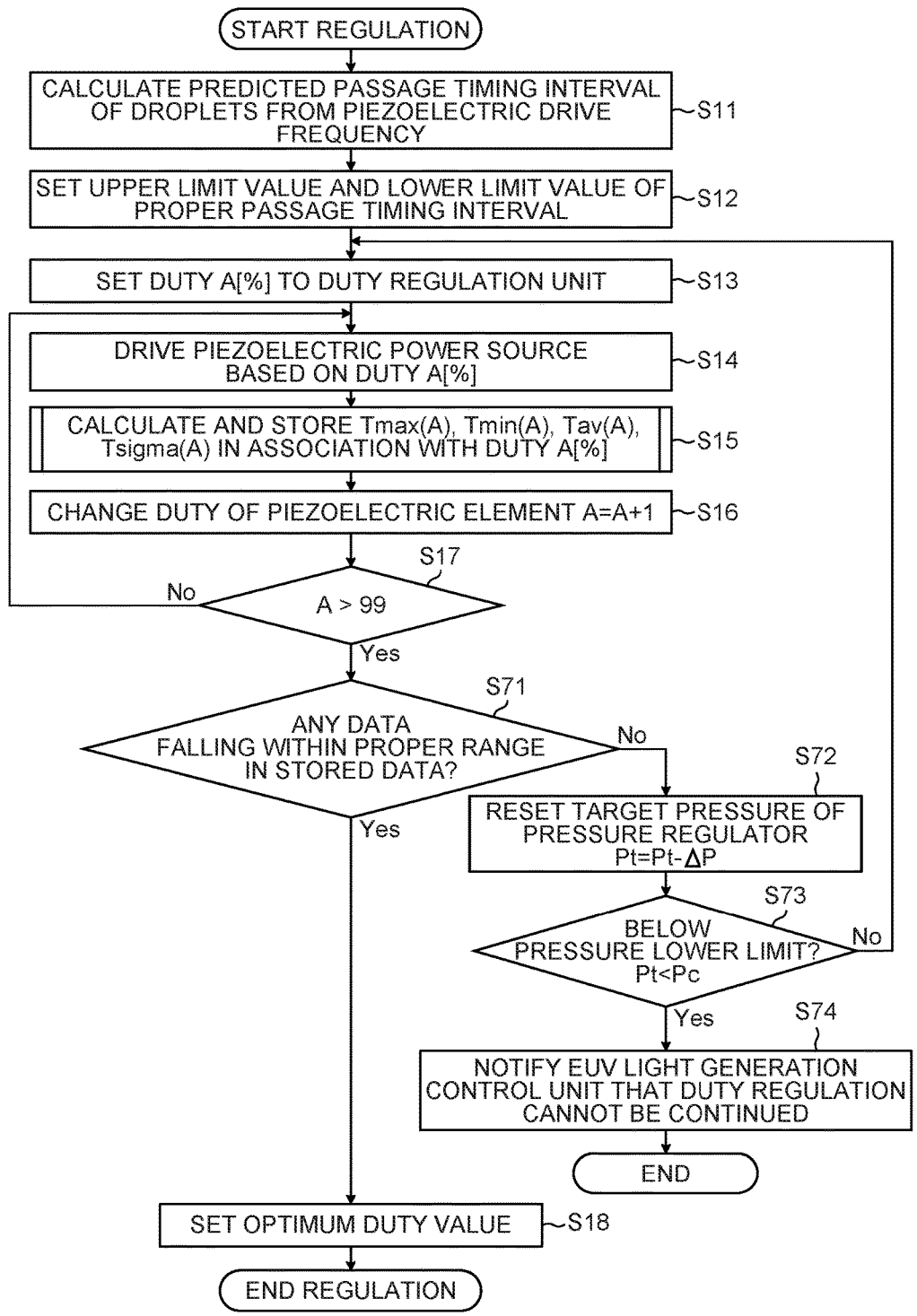
FIG. 33 is a flowchart illustrating contents of a process of duty regulation in the sixth embodiment.

At step S8 of FIG. 12, the control unit 70 may perform a subroutine illustrated in FIG. 33 instead of the process of duty regulation described in FIG. 14.

FIG. 33 is a flowchart illustrating contents of the process of duty regulation in step S8 of FIG. 12. Regarding FIG. 33, a difference from the flowchart of FIG. 14 will be described. In the flowchart of FIG. 33, steps S71 to S74 are added between step S17 and step S18.

When the control unit 70 determines to be "yes" in the determination process at step S17, the control unit 70 may move to step S71. At step S71, the control unit 70 may determine whether or not there is data falling within the proper range, in the data stored at step S15. When determining that there is data falling within the proper range at step S71, the control unit 70 may move to step S18.

On the other hand, when determining that there is no data falling within the proper range at step S71, the control unit 70 may move to step S72. At step S72, the control unit 70 may reset target pressure $P_t$ of the pressure regulator 90. The case where it is determined to be "no" in the determination process at step S71 corresponds to a form of "the case where there is no duty value with which a passage time interval measurement value falls within a proper range, among a plurality of duty values".

There is a case where processes from step S11 to step S17 are performed and an optimum duty is once searched and data groups such as Tmax(A) and the like are stored for each duty A, but no data of any duty falls within a proper range of droplet passage timing intervals. In that case, the control unit 70 may reset the target pressure to control the pressure regulator 90 in order to lower the pressure of the tank 82. As such, in the control unit 70, a pressure correction amount $\Delta P$ may be stored in advance. For example, the pressure correction amount $\Delta P$ is a positive value, and may be an appropriate value set within a range from 1 MPa to 10 MPa. The control unit 70 may reset pressure $(P_t-\Delta P)$ obtained by lowering the currently set target pressure $P_t$ by the pressure correction amount $\Delta P$, as new target pressure $P_t$.

This corresponds to an operation of decreasing the pressure of the tank 82 in the case where the duty regulation is performed by the processes from step S13 to step S17, but there is nothing falling within the proper range of the droplet passage timing intervals for every duty A. When the pressure of the tank 82 is decreased, the velocity of a droplet discharged from a nozzle hole 80a is lowered, and a distance from discharging to completion of coalescence of droplets is shortened. A distance from discharging to completion of coalescence of droplets is referred to as a "coalescence distance".

When the pressure of the tank 82 is lowered, the coalescence distance is shortened. Therefore, a plurality of droplets complete coalescence upstream of the droplet trajectory in the detection region of the droplet detection device 76. The detection region of the droplet detection device 76 is positioned upstream of the droplet trajectory from the plasma generation region 26 that is a plasma light emitting point. When the pressure of the tank 82 is lowered, the coalescence distance is shortened, whereby coalescence failure of droplets in the plasma generation region 26 can be solved.

After the control unit 70 resets target pressure for controlling the pressure regulator 90 at step S72, the control unit 70 may move to step S73. At step S73, the control unit 70 may determine whether or not the reset target pressure $P_t$ falls below a pressure lower limit $P_c$. As such, in the control unit 70, the pressure lower limit $P_c$ may be stored in advance. As an example of a specific numerical value, the pressure lower limit $P_c$ is set to 10 MPa. When the reset target pressure $P_t$ does not fall below the pressure lower limit $P_c$, the control unit 70 may return to step S13, and search for an optimum duty again by the processes from step S13 to step S17 in the state where the pressure of the tank 82 is changed.

On the other hand, when the reset target pressure $P_t$ falls below the pressure lower limit $P_c$, at step S73, the control unit 70 may move to step S74 and notify the EUV light generation control unit 40 that duty regulation cannot be continued. The droplet velocity depending on the pressure of the tank 82 has a lower limit value. When the droplet velocity drops, a distance between droplets is shortened. Thereby, plasma by the droplet being irradiated with laser light disturbs the trajectory of the next droplet to be irradiated. A distance between droplets is limited depending on a level of trajectory disturbance by which output EUV light affects the exposure performance. Accordingly, the pressure of the tank 82 also has a lower limit. As a result of resetting the target pressure, if it falls below the pressure lower limit $P_c$, regulation cannot be made. Accordingly, when the target pressure falls below the pressure lower limit $P_c$, the control unit 70 may terminate control of the duty regulation after notifying the EUV light generation control unit 40 that duty regulation cannot be continued.

11.3 Effect

According to the sixth embodiment, an effect similar to that of the first embodiment can be achieved. Further, according to the sixth embodiment, in the case where an optimum duty cannot be found and a faulty coalesced droplet is generated even though duty regulation of a drive signal applied to the piezoelectric element 88 is performed, such a state is detected and the pressure of the tank 82 is lowered. When the pressure of the tank 82 is lowered, the droplet flow rate is lowered, and the coalescence distance is shortened. Thereby, coalescence failure can be solved.

As a specific example, when duty regulation was performed under the condition that the pressure of the tank 82 was 40 MPa and the droplet flow rate was about 90 m/s, there was a case where an optimum duty value with which droplets were coalescent stably could not be found. In that case, when duty regulation was performed under the condition that the pressure of the tank 82 was lowered to 32 MPa and the droplet flow rate was about 79 m/s, an optimum duty value could be set.

According to the sixth embodiment, in addition to duty regulation of a drive signal applied to the piezoelectric element 88, by performing regulation to lower the pressure of the tank 82 as required, it is possible to solve coalescence failure of droplets at the position of the plasma generation region 26.

12. Seventh Embodiment: Description of Target Supply Device According to Seventh Embodiment 12.1 Configuration The configuration of a seventh embodiment is similar to that of FIG. 17, and a configuration similar to that of the control system 150 described in FIG. 32 may be adopted.

12.2 Operation

The seventh embodiment may adopt a flowchart similar to that of FIG. 12. At step S8 of FIG. 12, the control unit 70 may perform a subroutine illustrated in FIG. 34 instead of the process of duty regulation described in FIG. 18.

Figure 34:
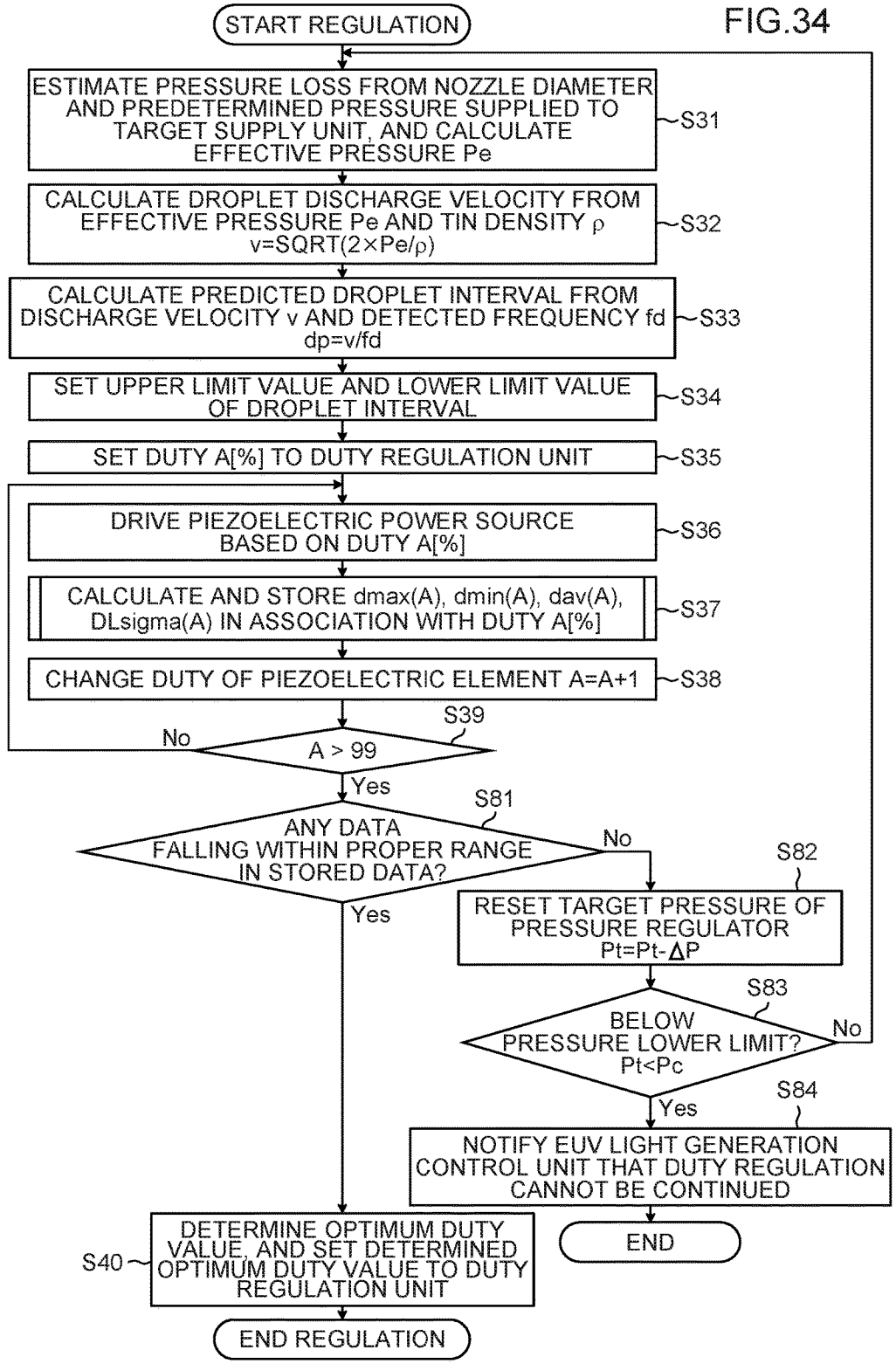
FIG. 34 is a flowchart illustrating contents of a process of duty regulation in a seventh embodiment.

FIG. 34 is a flowchart illustrating contents related to a process of duty regulation in the seventh embodiment. FIG. 34 is a flowchart illustrating contents of the process of duty regulation in step S8 of FIG. 12. Instead of the flowchart of duty regulation of the second embodiment described in FIG. 18, the flowchart of FIG. 34 may be adopted. Regarding the flowchart of FIG. 34, a difference from the flowchart of FIG. 18 will be described.

In the flowchart of FIG. 34, steps S81 to S84 are added between step S39 and step S40. Steps S81 to S84 may be the same as steps S71 to S74 of the flowchart illustrated in FIG. 33, respectively.

When the control unit 70 determines to be "yes" in the determination process at step S39, the control unit 70 may move to step S81. At step S81, the control unit 70 may determine whether or not there is data falling within the proper range, in the data stored at step S37. When determining that there is data falling within the proper range at step S81, the control unit 70 may move to step S40.

On the other hand, when determining that there is no data falling within the proper range at step S81, the control unit 70 may move to step S82. At step S82, the control unit 70 may reset the target pressure $P_t$ of the pressure regulator 90. The case where it is determined to be "no" in the determination process at step S81 corresponds to a form of "the case where there is no duty value with which an inter-droplet distance measurement value falls within a proper range, among a plurality of duty values".

There is a case where the processes from step S31 to step S39 are performed and an optimum duty is once searched and data groups such as dmax(A) and the like are stored for each duty A, but no data of any duty falls within a proper range of droplet passage timing intervals. In that case, the control unit 70 may reset target pressure to control the pressure regulator 90 in order to lower the pressure of the tank 82. In the control unit 70, the pressure correction amount ΔP may be stored in advance. The control unit 70 may reset pressure $(P_t-\Delta P)$ obtained by lowering the currently set target pressure $P_t$ by the pressure correction amount ΔP, as new target pressure $P_t$. After the control unit 70 resets target pressure to control the pressure regulator 90 at step S82, the control unit 70 may move to step S83.

At step S83, the control unit 70 may determine whether or not the reset target pressure $P_t$ falls below the pressure lower limit $P_c$. When the reset target pressure $P_t$ does not fall below the pressure lower limit $P_c$, the control unit 70 may return to step S31, and search for an optimum duty again by the processes from step S31 to step S39 in the state where the pressure of the tank 82 is changed. It should be noted that the "predetermined pressure" described in step S31 corresponds to the pressure that is realized when the pressure regulator 90 regulates the pressure of the tank 82 in accordance with the target pressure $P_t$. To simplify, effective pressure $P_e$ may be used as the target pressure $P_t$.

On the other hand, when the reset target pressure $P_t$ falls below the pressure lower limit $P_c$, at step S83, the control unit 70 may move to step S84 and notify the EUV light generation control unit 40 that duty regulation cannot be continued. When the target pressure $P_t$ falls below the pressure lower limit $P_c$, the control unit 70 may terminate control of the duty regulation after notifying the EUV light generation control unit 40 that duty regulation cannot be continued.

12.3 Effect

According to the seventh embodiment, an effect similar to that of the second embodiment can be achieved. Further, according to the seventh embodiment, in the case where a faulty coalesced droplet is generated even though duty regulation of a drive signal applied to the piezoelectric element 88 is performed, such a state is detected and the pressure of the tank 82 is lowered. When the pressure of the tank 82 is lowered, the droplet flow rate is lowered, and the coalescence distance is shortened. Thereby, coalescence failure can be solved.

13. Eighth Embodiment: Description of Target Supply Device According to Eighth Embodiment 13.1 Configuration The eighth embodiment may adopt a configuration similar to that of the control system 150 described in FIG. 32.

13.2 Operation

Even in the case where the process of duty regulation of step S8 in FIG. 12 is performed and coalescence failure of droplets is temporarily solved, coalescence failure may occur again thereafter. According to the eighth embodiment in which the flowchart of FIG. 35 is executed, such a situation may be improved.

Figure 35:
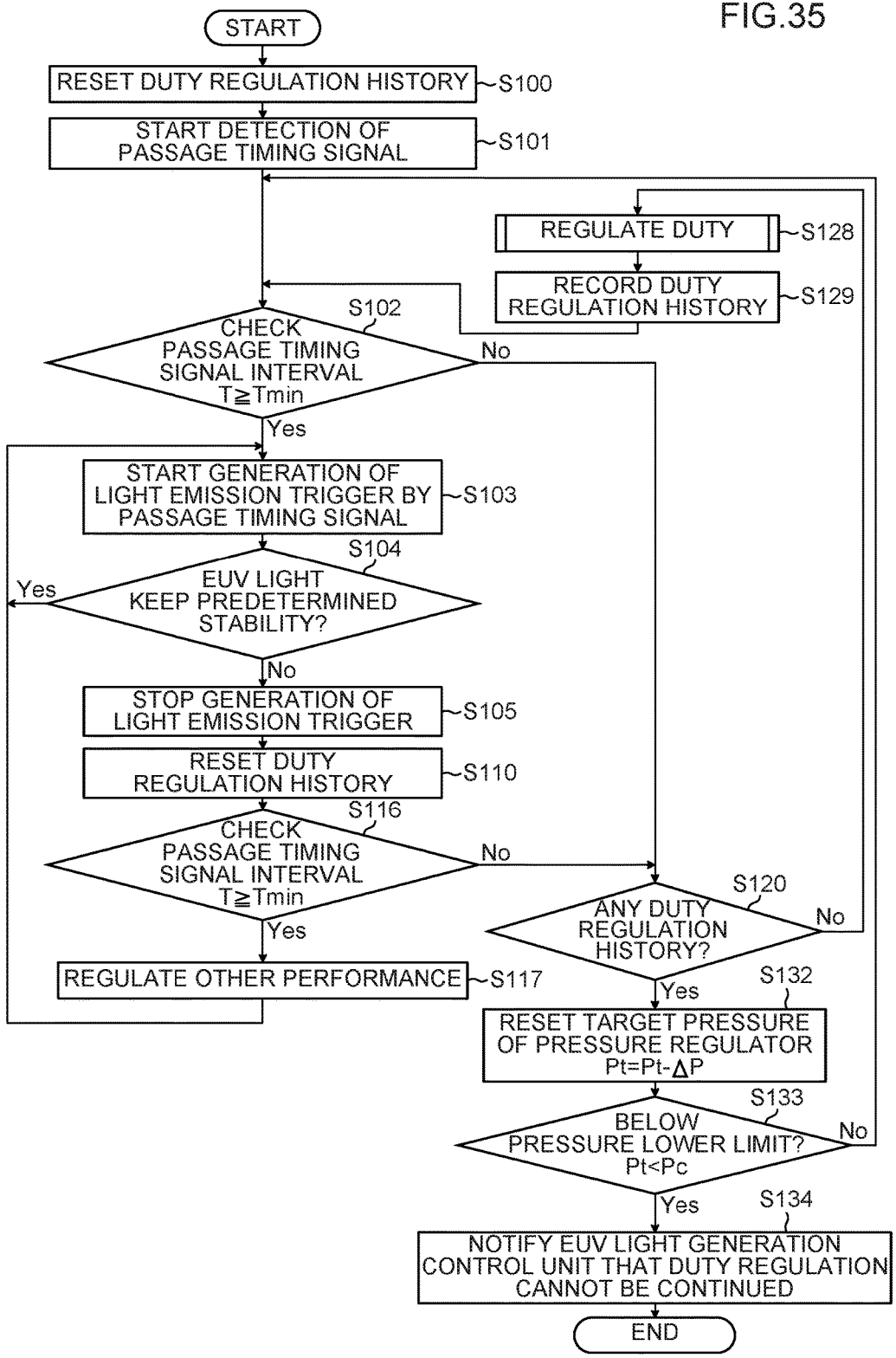
FIG. 35 is a flowchart illustrating an exemplary operation of a control unit in an eighth embodiment.

FIG. 35 is a flowchart illustrating an exemplary operation of the control unit 70 in the eighth embodiment. The control unit 70 may perform the flowchart of FIG. 35, instead of the flowchart of FIG. 12. Steps S101 to S105 of FIG. 35 may adopt steps similar to steps S1 to S5 of FIG. 12. Steps S116 and S117 of FIG. 35 may adopt steps similar to steps S6 and S7 of FIG. 12. Further, step S128 of FIG. 35 may adopt a step similar to step S8 of FIG. 12.

Hereinafter, regarding the flowchart of FIG. 35, a difference from the flowchart of FIG. 12 will be described. In the flowchart of FIG. 35, prior to step S101, a step of resetting the duty regulation history (step S100) is added. Further, between step S105 and step S116, a step of resetting the duty regulation history (step S110) is added. Furthermore, the flowchart of FIG. 35 includes step S120 and steps S128, S129, and S132 to S134 as processes to be performed when it is determined to be "no" in the determination process at the respective steps S102 and S116.

Steps S132 to S134 may be steps similar to steps S72 to S74 of the flowchart illustrated in FIG. 33.

At step S100, the control unit 70 may reset the duty regulation history prior to detection of a passage timing signal. The duty regulation history is information showing whether or not duty regulation has been performed after the start of the target supply unit 18. The duty regulation history may be a flag configured on the memory of the control unit 70. As a specific example of a process to reset the duty regulation history, the control unit 70 may update the flag to an initial value 0.

In the passage timing interval checking process of step S102, when the control unit 70 determines that T≥Tmin is not satisfied, that is, when the control unit 70 determines that T<Tmin, the control unit 70 may move to step S120.

At step S120, the control unit 70 determines whether or not there is any duty regulation history. For example, the control unit 70 may determine whether the flag of duty regulation history is "0" or "1".

In the determination process of step S120, when there is no duty regulation history, that is, when duty regulation has not been performed, the control unit 70 may move to step S128 to perform duty regulation. The contents of duty regulation at step S128 is similar to those of step S8 of FIG. 12.

After performing duty regulation of step S128, at step S129, the control unit 70 may record execution of duty regulation in the duty regulation history. This means that the control unit 70 may perform a process of rewriting the flag of duty regulation history from "0" to "1". After the duty regulation history recording process of step S129, the control unit 70 may move to step S102.

On the other hand, in the determination process of step S120, when there is a duty regulation history, that is, when duty regulation has been performed, the control unit 70 may reset the target pressure to control the pressure regulator 90 at step S132. The control unit 70 may reset the pressure ($P_t - \Delta P$) obtained by lowering the currently set target pressure $P_t$ by the pressure correction amount $\Delta P$, as new target pressure $P_t$. After the control unit 70 resets target pressure to control the pressure regulator 90 at step S132, the control unit 70 may move to step S133.

At step S133, the control unit 70 may determine whether or not the reset target pressure $P_t$ falls below the pressure lower limit $P_c$. When the reset target pressure $P_t$ does not fall below the pressure lower limit $P_c$, the control unit 70 may return to step S102, and check an interval between passage timing signals in the state where the pressure of the tank 82 is changed.

On the other hand, when the reset target pressure $P_t$ falls below the pressure lower limit $P_c$, at step S133, the control unit 70 may move to step S134 and notify the EUV light generation control unit 40 that duty regulation cannot be continued. When the target pressure $P_t$ falls below the pressure lower limit $P_c$, the control unit 70 terminates control of the duty regulation after notifying the EUV light generation control unit 40 that duty regulation cannot be continued.

Further, when the control unit 70 determines that EUV light does not keep predetermined stability at step S104 and stops generation of a light emission trigger at step S105, the control unit 70 resets the duty regulation history at step S110. The reason of resetting the duty regulation history at step S110 is to prevent the control unit 70 from determining that "there is a duty regulation history" and resetting the target pressure before the duty regulation.

13.3 Effect

According to the eighth embodiment, in the case where generation of a faulty coalesced droplet is detected after performing duty regulation of a drive signal applied to the piezoelectric element 88, pressure regulation to lower the pressure of the tank 82 is performed. Thereby, the coalescence distance can be shortened, and coalescence failure can be solved.

14. Example of Combination of Embodiments

The contents of the respective embodiments from the first embodiment to the eighth embodiment are applicable by being combined with each other. For example, combinations as described below can be made.

[Exemplary combination 1] The flowchart of FIG. 24 and the flowchart of FIG. 33 can be combined. This means that regarding step S58 of FIG. 24, the flowchart of FIG. 33 is applicable.

[Exemplary combination 2] The flowchart of FIG. 24 and the flowchart of FIG. 34 can be combined. This means that regarding step S58 of FIG. 24, the flowchart of FIG. 34 is applicable.

[Exemplary combination 3] The flowchart of FIG. 30 and the flowchart of FIG. 33 can be combined. This means that regarding step S68 of FIG. 30, the flowchart of FIG. 33 is applicable.

[Exemplary combination 4] The flowchart of FIG. 30 and the flowchart of FIG. 34 can be combined. This means that regarding step S68 of FIG. 30, the flowchart of FIG. 34 is applicable.

[Exemplary combination 5] The flowchart of FIG. 35 and the flowchart of

FIG. 33 can be combined. This means that regarding step S128 of FIG. 35, the flowchart of FIG. 33 is applicable.

[Exemplary combination 6] The flowchart of FIG. 35 and the flowchart of FIG. 34 can be combined. This means that regarding step S128 of FIG. 35, the flowchart of FIG. 34 is applicable.

Further, as another variation, like a relationship between FIGS. 12 and 35, regarding the respective flowcharts of FIGS. 24 and 30, a process of managing the duty regulation history and a process of lowering the pressure of the tank 82 can be applied, similar to the flowchart of FIG. 35. In the flowchart of FIG. 35, the process of managing the duty regulation history includes steps S100, S110, S120, and S129. In the flowchart of FIG. 35, the process of lowering the pressure of the tank 82 includes steps S132 to S134.

15. Hardware Environment of Each Control Unit

A person skilled in the art may understand that the subject described herein is carried out by combining a general purpose computer or a programmable controller and a program module or a software application. In general, a program module includes a routine that can execute the processes described in the present disclosure, a program, a component, a data structure, and the like.

Figure 36:
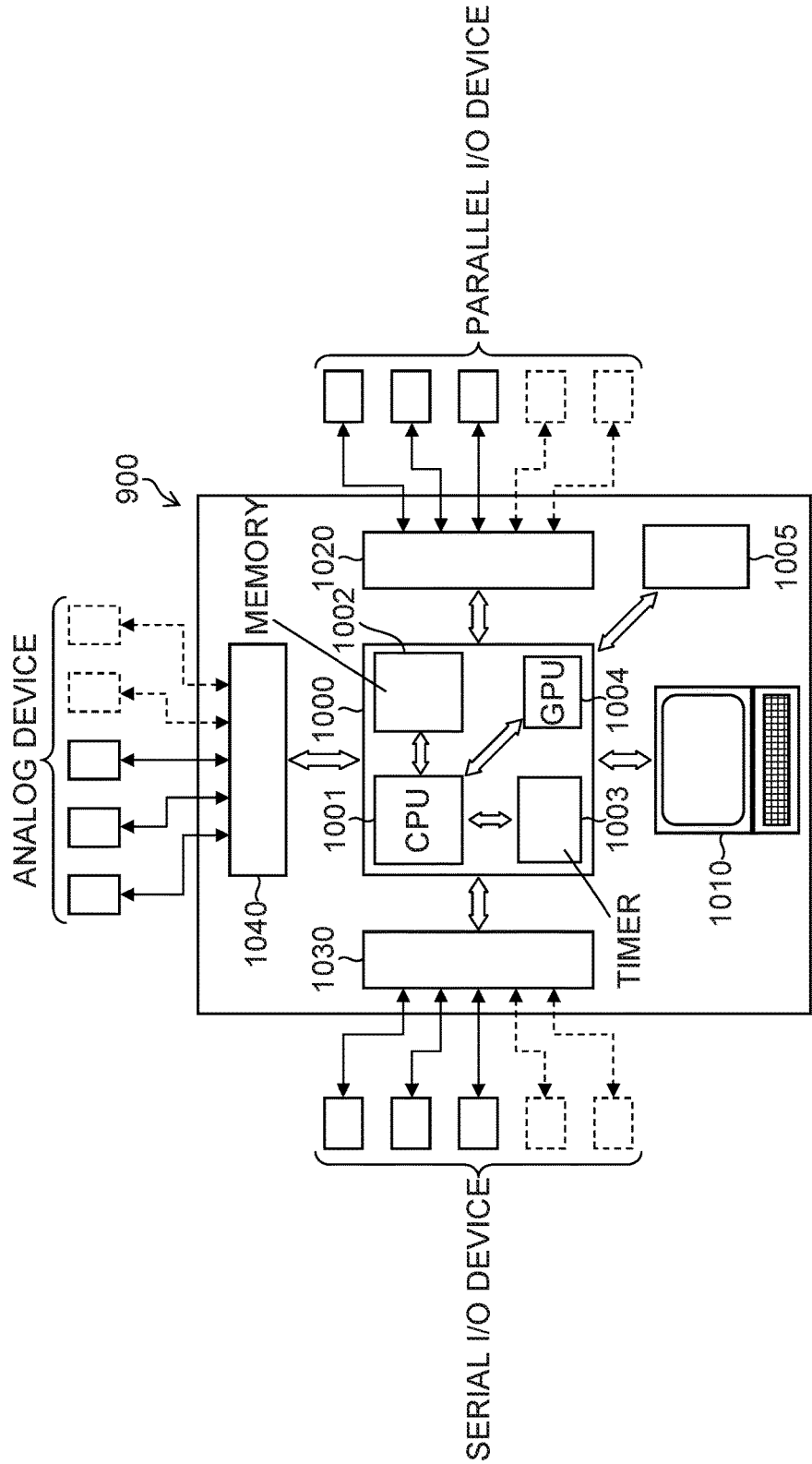
FIG. 36 is a block diagram illustrating an exemplary hardware environment of each control unit.

FIG. 36 is a block diagram illustrating an exemplary hardware environment in which various aspects of the disclosed subject can be executed. An exemplary hardware environment 900 of FIG. 36 may include a processing unit 1000, a storage unit 1005, a user interface 1010, a parallel I/O controller 1020, a serial I/O controller 1030, an A/D and D/A converter 1040. However, the configuration of the hardware environment 900 is not limited to this configuration. "I/O" represents "input/output". "A/D" represents "analog to digital". "D/A" represents "digital to analog".

The processing unit 1000 may include a central processing unit (CPU) 1001, a memory 1002, a timer 1003, and a graphics processing unit (GPU) 1004. The memory 1002 may include a random access memory (ROM) and a read only memory (ROM). The CPU 1001 may be any of commercially available processors. A dual microprocessor or another multiprocessor architecture may be used as the CPU 1001.

These configurations in FIG. 36 may be connected with each other in order to perform processes described in the present disclosure.

In operation, the processing unit 1000 may read a program stored in the storage unit 1005 and execute it. The processing unit 1000 may also read data along with the program from the storage unit 1005. Further, the processing unit 1000 may write data into the storage unit 1005. The CPU 1001 may execute a program read from the storage unit 1005. The memory 1002 may be a work region for temporarily storing a program to be executed by the CPU 1001 and data to be used for operation of the CPU 1001. The timer 1003 may measure time intervals and output a measurement result to the CPU 1001 in accordance with execution of a program. The GPU 1004 may process image data and output a processing result to the CPU 1001, in accordance with a program read from the storage unit 1005.

The parallel I/O controller 1020 may be connected with parallel I/O devices communicable with the processing unit 1000, such as an exposure device control unit, the EUV light generation control unit 40, the laser light travel direction control unit 54, the control unit 70, the delay circuit 72, the temperature controller 94, the image acquisition controller 200, the control circuit 252, and the like, and may control communication between the processing unit 1000 and such parallel I/O devices. The serial I/O controller 1030 may be connected with serial I/O devices communicable with the processing unit 1000, such as the heater power source 92, the piezoelectric power source 96, the pressure regulator 90, the light source 102, the light source 172, and the like, and may control communication between the processing unit 1000 and such serial I/O devices. The A/D and D/A converter 1040 may be connected with analog devices such as a temperature sensor, a pressure sensor, various sensors of vacuum gauge, the optical sensor 124, the image sensor 194, and the like, and may control communication between the processing unit 1000 and such analog devices, and perform A/D conversion or D/A conversion of the communication content.

The user interface 1010 may display progress of a program executed by the processing unit 1000 to an operator such that the operator is able to instruct the processing unit 1000 to stop the program or execute an interruption routine.

The illustrative hardware environment 900 may be applicable to the configurations of the EUV light generation control unit 40, the laser light travel direction control unit 54, the control unit 70, the temperature controller 94, the image acquisition controller 200, and the like. A person skilled in the art will understand that such controllers can be realized in a distributed computing environment, that is, an environment in which a task is executed by processing units linked over a communication network. In the present disclosure, an exposure device control unit, the EUV light generation control unit 40, the laser light travel direction control unit 54, the control unit 70, the temperature controller 94, the image acquisition controller 200, and the like may be connected with each other over a communication network such as the Ethernet (registered trademark) or the Internet. In a distributed computing environment, a program module may be stored in memory storage devices of both local and remote.

The description provided above is intended to provide just examples without any limitations. Accordingly, it will be obvious to those skilled in the art that changes can be made to the embodiments of the present disclosure without departing from the scope of the accompanying claims.

The terms used in the present description and in the entire scope of the accompanying claims should be construed as terms "without limitations". For example, a term "including" or "included" should be construed as "not limited to that described to be included". A term "have" should be construed as "not limited to that described to be held". Moreover, an indefinite article "a/an" described in the present description and in the accompanying claims should be construed to mean "at least one" or "one or more".

What is claimed is:

1. A target supply device comprising:
   a tank configured to contain a liquid target substance;
   a nozzle configured to output the target substance contained in the tank;
   an excitation element to be driven when an electric signal of a rectangular wave is input, the excitation element being configured to vibrate the target substance to be output from the nozzle to thereby generate a droplet of the target substance;
   a droplet detection unit configured to detect the droplet output from the nozzle;
   a passage time interval measurement unit configured to measure a passage time interval of the droplets, based on a detection signal obtained from the droplet detection unit; and
   a control unit configured to determine an operation duty value that is a duty value of the electric signal suitable for operation of the excitation element, based on a passage time interval measurement value measured by the passage time interval measurement unit,
   the control unit performing:
   a process of setting a proper range of the passage time interval;
   a process of changing the duty value of the electric signal to be input to the excitation element, and for a plurality of duty values, inputting the electric signal of each of the duty values to the excitation element, and storing the passage time interval measurement values of droplets generated with each of the duty values and variation in the passage time interval measurement values, in association with the duty values; and a process of determining the operation duty value based on the variation from among the duty values with which the passage time interval measurement values are within the proper range, among the duty values.

2. The target supply device according to claim 1, wherein the control unit calculates a predicted passage time interval of the droplets from a drive frequency of operating the excitation element, and based on the calculated predicted passage time interval, determines an upper limit value and a lower limit value of the proper range.

3. The target supply device according to claim 1, wherein among the duty values, the control unit determines a duty value with which the variation becomes smallest, among the duty values with which the passage time interval measurement values are within the proper range, to be the operation duty value.

4. The target supply device according to claim 1, wherein the control unit sets a reference value of the passage time interval, and when the passage time interval measurement value falls below the reference value, the control unit acquires the passage time interval measurement values corresponding to the duty values, and based on the acquired passage time interval measurement values and the variation, performs the process of determining the operation duty value.

5. The target supply device according to claim 4, further comprising a pressure regulator configured to regulate pressure of the tank, wherein when the passage time interval measurement value falls below the reference value after the control unit performs the process of determining the operation duty value, the control unit controls the pressure regulator to lower the pressure of the tank.

6. The target supply device according to claim 1, further comprising:

a droplet image detection unit including a two-dimensional image sensor configured to capture an image of the droplet output from the nozzle; and an image measurement unit configured to perform detection of a faulty coalesced droplet and/or detection of presence or absence of a satellite, based on an output image from the droplet image detection unit, wherein in the output image, when a cross-section profile on a determination line in a direction orthogonal to a direction of discharging the droplet has a plurality of peaks, the control unit acquires the passage time interval measurement values corresponding to the duty values, and performs the process of determining the operation duty value based on the acquired passage time interval measurement values and the variation.

7. The target supply device according to claim 1, wherein the droplet detection unit includes an optical sensor having a plurality of light receiving surfaces, and when generation of a satellite is detected based on a signal output from each of the light receiving surfaces, the control unit acquires the passage time interval measurement values corresponding to the duty values, and based on the acquired passage time interval measurement values and the variation, performs the process of determining the operation duty value.

8. The target supply device according to claim 1, further comprising:

a heater assembled to the nozzle;

a nozzle temperature sensor configured to detect temperature of the nozzle; and a temperature controller configured to control the heater based on temperature information obtained from the nozzle temperature sensor, wherein the temperature controller controls the temperature of the nozzle within a range of ±0.1° C. of a predetermined temperature.

9. The target supply device according to claim 1, further comprising a pressure regulator configured to regulate pressure of the tank, wherein when there is no duty value with which the passage time interval measurement value falls within the proper range in the duty values, the control unit controls the pressure regulator to lower the pressure of the tank.

10. An extreme ultraviolet light generating device comprising:

the target supply device according to claim 1; and a chamber having a window for introducing laser light, output from a laser light source, to an inside of the chamber, the droplet that is a target being supplied from the target supply device into the chamber, the target being made into plasma when being irradiated with the laser light and generating extreme ultraviolet light.

11. A target supply device comprising:

a tank configured to contain a liquid target substance;

a nozzle configured to output the target substance contained in the tank;

an excitation element to be driven when an electric signal of a rectangular wave is input, the excitation element being configured to vibrate the target substance output from the nozzle to thereby generate a droplet of the target substance;

a droplet detection unit configured to detect the droplet output from the nozzle;

a passage time interval measurement unit configured to measure a passage time interval of the droplets, based on a detection signal obtained from the droplet detection unit; and a control unit configured to determine an operation duty value that is a duty value of the electric signal suitable for operation of the excitation element, based on a passage time interval measurement value measured by the passage time interval measurement unit, the control unit performing:

a process of calculating an inter-droplet distance measurement value representing an inter-droplet distance from the passage time interval measurement value;

a process of setting a proper range of the inter-droplet distance;

a process of changing the duty value of the electric signal to be input to the excitation element, and for a plurality of duty values, inputting the electric signal of each of the duty values to the excitation element, and storing the inter-droplet distance measurement values of droplets generated with each of the duty values and variation in the inter-droplet distance measurement values, in association with the duty values; and a process of determining the operation duty value based on the variation from among the duty values with which the inter-droplet distance measurement values are within the proper range, among the duty values.

12. The target supply device according to claim 11, wherein
the control unit calculates a predicted inter-droplet distance of the droplets from set pressure of the tank, density of the target substance, and a detected frequency of the droplets, and based on the calculated predicted inter-droplet distance, the control unit determines an upper limit value and a lower limit value of the proper range.

13. The target supply device according to claim 11, wherein
among the duty values, the control unit determines a duty value with which the variation becomes smallest, among the duty values with which the inter-droplet distance measurement values are within the proper range, to be the operation duty value.

14. The target supply device according to claim 11, wherein
the control unit sets a reference value of the passage time interval, and
when the passage time interval measurement value falls below the reference value, the control unit acquires the passage time interval measurement values corresponding to the duty values, and based on the inter-droplet distance measurement values and the variation obtained from the acquired passage time interval measurement values, performs the process of determining the operation duty value.

15. The target supply device according to claim 14, further comprising
a pressure regulator configured to regulate pressure of the tank, wherein
when the passage time interval measurement value falls below the reference value after the control unit performs the process of determining the operation duty value, the control unit controls the pressure regulator to lower the pressure of the tank.

16. The target supply device according to claim 11, further comprising:
a droplet image detection unit including a two-dimensional image sensor configured to capture an image of the droplet output from the nozzle; and
an image measurement unit configured to perform detection of a faulty coalesced droplet and/or detection of presence or absence of a satellite, based on an output image from the droplet image detection unit, wherein
in the output image, when a cross-section profile on a determination line in a direction orthogonal to a direction of discharging the droplet has a plurality of peaks, the control unit acquires the passage time interval measurement values corresponding to the duty values, and performs the process of determining the operation duty value based on the inter-droplet distance measurement values and the variation obtained from the acquired passage time interval measurement values.

17. The target supply device according to claim 11, wherein
the droplet detection unit includes an optical sensor having a plurality of light receiving surfaces, and
when generation of a satellite is detected based on a signal output from each of the light receiving surfaces, the control unit acquires the passage time interval measurement values corresponding to the duty values, and based on the inter-droplet distance measurement values and the variation obtained from the acquired passage time interval measurement values, performs the process of determining the operation duty value.

18. The target supply device according to claim 11, further comprising:
a heater assembled to the nozzle;
a nozzle temperature sensor configured to detect temperature of the nozzle; and
a temperature controller configured to control the heater based on temperature information obtained from the nozzle temperature sensor, wherein
the temperature controller controls the temperature of the nozzle within a range of ±0.1° C. of a predetermined temperature.

19. The target supply device according to claim 11, further comprising
a pressure regulator configured to regulate pressure of the tank, wherein
when there is no duty value with which the inter-droplet distance measurement value falls within the proper range in the duty values, the control unit controls the pressure regulator to lower the pressure of the tank.

20. An extreme ultraviolet light generating device comprising:
the target supply device according to claim 11; and
a chamber having a window for introducing laser light, output from a laser light source, to an inside of the chamber,
the droplet that is a target being supplied from the target supply device into the chamber, the target being made into plasma when being irradiated with the laser light and generating extreme ultraviolet light.

* * * * *